(12) United States Patent
Hsu et al.

(10) Patent No.: US 8,724,237 B2
(45) Date of Patent: May 13, 2014

(54) OPTICAL PHOTOGRAPHING LENS SYSTEM

(71) Applicant: Largan Precision Co., Ltd., Taichung (TW)

(72) Inventors: Po-Lun Hsu, Taichung (TW); Chun-Shan Chen, Taichung (TW); Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 52 days.

(21) Appl. No.: 13/671,542

(22) Filed: Nov. 7, 2012

(65) Prior Publication Data
US 2014/0043695 A1    Feb. 13, 2014

(30) Foreign Application Priority Data
Aug. 8, 2012 (TW) .............................. 101128645 A

(51) Int. Cl.
*G02B 9/62* (2006.01)
(52) U.S. Cl.
CPC ....................................... *G02B 9/62* (2013.01)
USPC ........................................................ 359/759

(58) Field of Classification Search
CPC ....................................................... G02B 9/62
USPC ........................................ 359/756, 757, 759
See application file for complete search history.

(56) References Cited
U.S. PATENT DOCUMENTS
5,404,246 A * 4/1995 Kaneko et al. ................ 359/649
* cited by examiner

*Primary Examiner* — Joseph P Martinez
(74) *Attorney, Agent, or Firm* — CKC & Partners Co., Ltd.

(57) ABSTRACT

An optical photographing lens system includes, in order from an object side to an image side, a first lens element, a second lens element, a third lens element, a fourth lens element, a fifth lens element and a sixth lens element. The first lens element with positive refractive power has a convex object-side surface. The second lens element has positive refractive power. The third lens element has negative refractive power. The fourth lens element with refractive power has a convex object-side surface and a concave image-side surface, wherein the surfaces thereof are aspheric. The fifth lens element with positive refractive power has a convex image-side surface, wherein the surfaces thereof are aspheric. The sixth lens element with negative refractive power has a concave image-side surface, wherein the image-side surface changes from concave at a paraxial region thereof to convex at a peripheral region thereof, and the surfaces thereof are aspheric.

28 Claims, 21 Drawing Sheets

OPTICAL PHOTOGRAPHING LENS SYSTEM

RELATED APPLICATIONS

The application claims priority to Taiwan Application Serial Number 101128645, filed Aug. 8, 2012, which is herein incorporated by reference.

BACKGROUND

1. Technical Field

The present invention relates to an optical photographing lens system. More particularly, the present invention relates to a compact optical photographing lens system applicable to electronic products.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a structure of four-element lens such as the one disclosed in U.S. Pat. No. 7,869,142. Due to the popularity of mobile products with high-end specifications, such as smart phones and PDAs (Personal Digital Assistants), the requirements for high resolution and image quality of modern compact optical lens systems has been increasing significantly. However, the conventional four-element lens structure cannot satisfy these requirements of the compact optical lens system.

For the traditional lens assembly technique, it is hard to achieve the compact size with more lenses and is unsuitable to apply on the compact and portable electronic product. In another conventional optical lens system with five-element lens such as the ones disclosed in U.S. Pat. No. 8,000,030, two lens elements which are closest to an object have positive refractive power and negative refractive power, respectively. However, the refractive power overly focuses to the lens element with positive refractive power, so that the spherical aberration is generated, and the telephoto functionality cannot be enhanced for reducing the back focal length and the total focal length of the optical lens system. Therefore, the high quality and compact optical lens system is hard to achieve.

SUMMARY

According to one aspect of the present disclosure, an optical photographing lens system includes, in order from an object side to an image side, a first lens element, a second lens element, a third lens element, a fourth lens element, a fifth lens element and a sixth lens element. The first lens element with positive refractive power has a convex object-side surface. The second lens element has positive refractive power. The third lens element has negative refractive power. The fourth lens element with refractive power has a convex object-side surface and a concave image-side surface, wherein the object-side surface and the image-side surface of the fourth lens element are aspheric. The fifth lens element with positive refractive power has a convex image-side surface, wherein an object-side surface and the image-side surface of the fifth lens element are aspheric. The sixth lens element with negative refractive power has a concave image-side surface, wherein the image-side surface of the sixth lens element changes from concave at a paraxial region thereof to convex at a peripheral region thereof, and an object-side surface and the image-side surface of the sixth lens element are aspheric. When a focal length of the optical photographing lens system is f, a focal length of the first lens element is f1, a focal length of the second lens element is f2, and a focal length of the fourth lens element is f4, the following relationships are satisfied:

$$0 < f2/f1 < 5.0; \text{ and}$$

$$0 < (f/f1)/((f/f2)+(f/f4)) < 2.0.$$

According to another aspect of the present disclosure, an optical photographing lens system includes, in order from an object side to an image side, a first lens element, a second lens element, a third lens element, a fourth lens element, a fifth lens element and a sixth lens element. The first lens element with positive refractive power has a convex object-side surface. The second lens element has positive refractive power. The third lens element has negative refractive power. The fourth lens element with refractive power has a convex object-side surface, wherein the object-side surface and an image-side surface of the fourth lens element are aspheric. The fifth lens element with refractive power has a convex image-side surface, wherein an object-side surface and the image-side surface of the fifth lens element are aspheric. The sixth lens element with negative refractive power has a concave image-side surface, wherein the image-side surface of the sixth lens element changes from concave at a paraxial region to convex at a peripheral region, and an object-side surface and the image-side surface of the sixth lens element are aspheric. When a focal length of the optical photographing lens system is f, a focal length of the first lens element is f1, a focal length of the second lens element is f2, a focal length of the fourth lens element is f4, and a curvature radius of the object-side surface of the fourth lens element is R7, the following relationships are satisfied:

$$0 < f2/f1 < 5.0;$$

$$0 < (f/f1)/((f/f2)+(f/f4)) < 2.0; \text{ and}$$

$$0.5 < f/R7 < 3.0.$$

According to yet another aspect of the present disclosure, an optical photographing lens system includes, in order from an object side to an image side, a first lens element, a second lens element, a third lens element, a fourth lens element, a fifth lens element and a sixth lens element. The first lens element with positive refractive power has a convex object-side surface. The second lens element has positive refractive power. The third lens element has negative refractive power. The fourth lens element with refractive power has an object-side surface and an image-side surface being aspheric. The fifth lens element with positive refractive power has a convex image-side surface, wherein an object-side surface and the image-side surface of the fifth lens element are aspheric. The sixth lens element with negative refractive power has a concave image-side surface, wherein the image-side surface of the sixth lens element changes from concave at a paraxial region to convex at a peripheral region, and an object-side surface and the image-side surface of the sixth lens element are aspheric. When a focal length of the optical photographing lens system is f, a focal length of the first lens element is f1, a focal length of the second lens element is f2, a focal length of the fourth lens element is f4, and an f-number of the optical photographing lens system is Fno, the following relationships are satisfied:

$$0 < f2/f1 < 5.0;$$

$$0 < (f/f1)/((f/f2)+(f/f4)) < 2.0; \text{ and}$$

$$1.5 < Fno < 2.5$$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
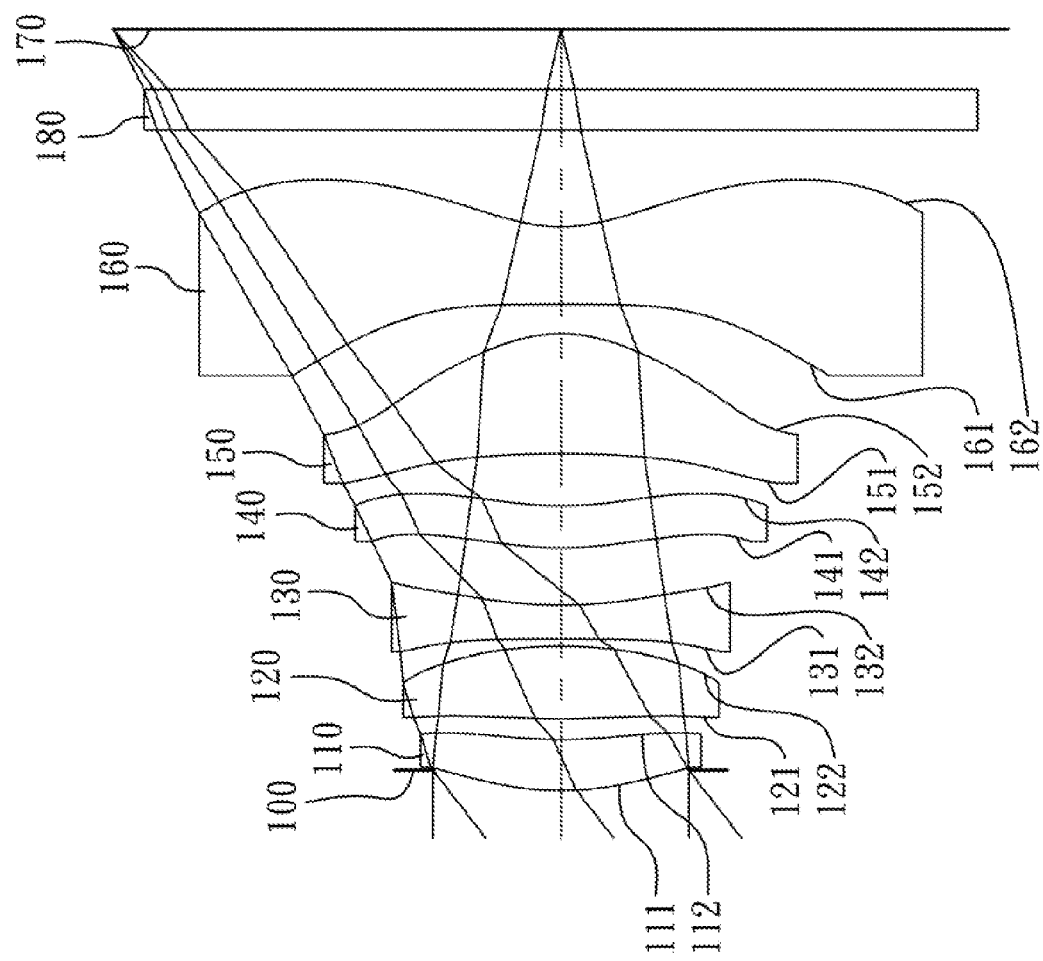
FIG. 1 is a schematic view of an optical photographing lens system according to the 1st embodiment of the present disclosure.

An optical photographing lens system includes, in order from an object side to an image side, a first lens element, a second lens element, a third lens element, a fourth lens element, a fifth lens element and a sixth lens element.

The first lens element with positive refractive power has a convex object-side surface and can have a concave image-side surface. Therefore, the total track length of the optical photographing lens system can be reduced by adjusting the positive refractive power of the first lens element.

The second lens element with positive refractive power can have a convex image-side surface, so that the positive refractive power of the first lens element can be balanced for avoiding the excessive distribution of refractive power from the first lens element. Therefore, the spherical aberration of the optical photographing lens system can be corrected.

The third lens element with negative refractive power can have a concave image-side surface, so that the aberration generated from the first lens element and the second lens element can be reduced.

The fourth lens element has a convex object-side surface and a concave image-side surface, so that the astigmatism of the optical photographing lens system can be corrected. Moreover, the object-side surface of the fourth lens element changes from convex at a paraxial region thereof to concave at a peripheral region thereof, and the image-side surface of the fourth lens element changes from concave at a paraxial region thereof to convex at a peripheral region thereof. Therefore, the angle at which the incident light projects onto an image sensor from the off-axis field can be effectively reduced, and the aberration of the off-axis field can be further corrected.

The fifth lens element with positive refractive power can have a concave object-side surface and a convex image-side. Therefore, the high order aberration of the optical photographing lens system can be corrected for enhancing the resolving power thereof and obtaining the high image quality.

The sixth lens element with negative refractive power has a concave image-side surface, so that the principal point of the optical photographing lens system can be positioned away from an image plane, and the total track length of the optical photographing lens system can be reduced while the back focal length be reduced so as to maintain the compact size of the optical photographing lens system. Moreover, the image-side surface of the sixth lens element changes from concave at a paraxial region thereof to convex at a peripheral region thereof, thus the angle at which the incident light projects onto the image sensor from the off-axis field can be effectively reduced, and the aberration of the off-axis field can be further corrected.

When a focal length of the first lens element is f1, and a focal length of the second lens element is f2, the following relationship is satisfied:

$$0 < f2/f1 < 5.0.$$

Therefore, the spherical aberration generated of the optical photographing lens system can be reduced by properly arranging the positive refractive power of the first lens element and the second lens element.

f1 and f2 can further satisfy the following relationship:

$$0 < f2/f1 < 1.0.$$

When a focal length of the optical photographing lens system is f, the focal length of the first lens element is f1, the focal length of the second lens element is f2, and a focal length of the fourth lens element is f4, the following relationship is satisfied:

$$0 < (f/f1)/((f/f2)+(f/f4)) < 2.0.$$

Therefore, the telephoto functionality of the optical photographing lens system can be enhanced for reducing the back focal length and the total track length of the optical photographing lens system, thus can apply to compact and portable electronics.

f, f1, f2 and f4 can further satisfy the following relationship:

$$0 < (f/f1)/((f/f2)+(f/f4)) < 1.0.$$

When the focal length of the optical photographing lens system is f, and the focal length of the fourth lens element is f4, the following relationship is satisfied:

$$-0.2 < f/f4 < 0.5.$$

Therefore, the sensitivity of the optical photographing lens system can be reduced by properly adjusting the refractive power of the fourth lens element.

When an Abbe number of the first lens element is V1, and an Abbe number of the third lens element is V3, the following relationship is satisfied:

$$0.3 < V3/V1 < 0.5.$$

Therefore, the chromatic aberration of the optical photographing lens system can be corrected.

When the focal length of the optical photographing lens system is f, and a curvature radius of the abject-side surface of the fourth lens element is R7, the following relationship is satisfied:

$$0.5 < f/R7 < 3.0.$$

Therefore, the sensitivity of the optical photographing lens system can be reduced effectively by properly adjusting the curvature of the object-side surface of the fourth lens element.

f and R7 can further satisfy the following relationship:

$$0.8 < f/R7 < 2.4,$$

When an axial distance between the second lens element and the third lens element is T23, and a distance in parallel with an optical axis between a maximum effective diameter position on the image-side surface of the second lens element and a maximum effective diameter position on an object-side surface of the third lens element is ET23, the following relationship is satisfied:

$$0 < T23/ET23 < 0.45.$$

Therefore, the yield rate of the assembling of the optical photographing lens system can be increased by the proper arrangement of the distance between the lens elements so as to maintain the compact size thereof.

When a central thickness of the third lens element is CT3, and a central thickness of the fourth lens element is CT4, the following relationship is satisfied:

$$0.20 \text{ mm} < CT3+CT4 < 0.65 \text{ mm}.$$

The lens element with too thick or too thin thickness would easily be poorly fabricated or broken. Therefore, the manufactured and the yield rate of the forming of the lens elements can be increased by the proper arrangement in thickness for the third lens element and the fourth lens element.

When an f-number of the optical photographing lens system is Fno, the following relationship is satisfied:

$$1.5 < Fno < 2.5$$

Therefore, the optical photographing lens system can have large aperture functionality, so that the optical photographing lens system can capture clear images by a high-speed shutter at the low light environment along with a longer depth of field.

When a curvature radius of an object-side surface of the second lens element is R3, and a curvature radius of the image-side surface of the second lens element is R4, the following relationship is satisfied:

$$-0.4 < (R3+R4)/(R3-R4) < 0.4.$$

Therefore, the spherical aberration or the aberration of the optical photographing lens system can be corrected by properly adjusting the curvature of the surfaces of the second lens element.

When a central thickness of the second lens element is CT2, and the central thickness of the third lens element is CT3, the folio wing relationship is satisfied:

$$0.2 < CT3/CT2 < 0.6.$$

The lens element with too thick or too thin thickness would easily be poorly fabricated or broken. Therefore, the yield rate of the manufactured lens elements can be increased by the proper arrangement in thickness for the second lens element and the third lens element.

When an axial distance between the first lens element and the second lens element is T12, the axial distance between the second lens element and the third lens element is T23, an axial distance between the third lens element and the fourth lens element is T34, and an axial distance between the fourth lens element and the fifth lens element is T45, the following relationship is satisfied:

$$0.1 < (T12+T23)/(T34+T45) < 0.32.$$

By the proper arrangement of the distances between the lens elements, the assembling of the optical photographing lens system as well as the yield rate can be improved.

According to the optical photographing lens system of the present disclosure, the lens elements thereof can be made of glass or plastic material. When the lens elements are made of glass material, the distribution of the refractive power of the optical photographing lens system may be more flexible to design. When the lens elements are made of plastic material, the manufacturing costs can be effectively reduced. Furthermore, surfaces of each lens element can be aspheric, so that it is easier to make the surfaces into non-spherical shapes. As a result, more controllable variables are obtained, and the aberration as well as the number of required lens elements can be reduced while constructing an optical system. Therefore, the total track length of the optical photographing lens system can also be reduced.

According to the optical photographing lens system of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the paraxial region of the surface is convex; and when the lens element has a concave surface, it indicates that the paraxial region of the surface is concave.

According to the optical photographing lens system of the present disclosure, the optical photographing lens system can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop which can be disposed between an object and the first lens element provides a longer distance from an exit pupil of the system to an image plane and thereby the generated telecentric effect improves the image-sensing efficiency of an image sensor. A middle stop which can be disposed between the first lens element and the image plane is favorable for enlarging the field of view of the system and thereby provides a wider field of view for the same.

According to the above description of the present disclosure, the following 1st -10th specific embodiments are provided for further explanation.

1st Embodiment

Figure 2:
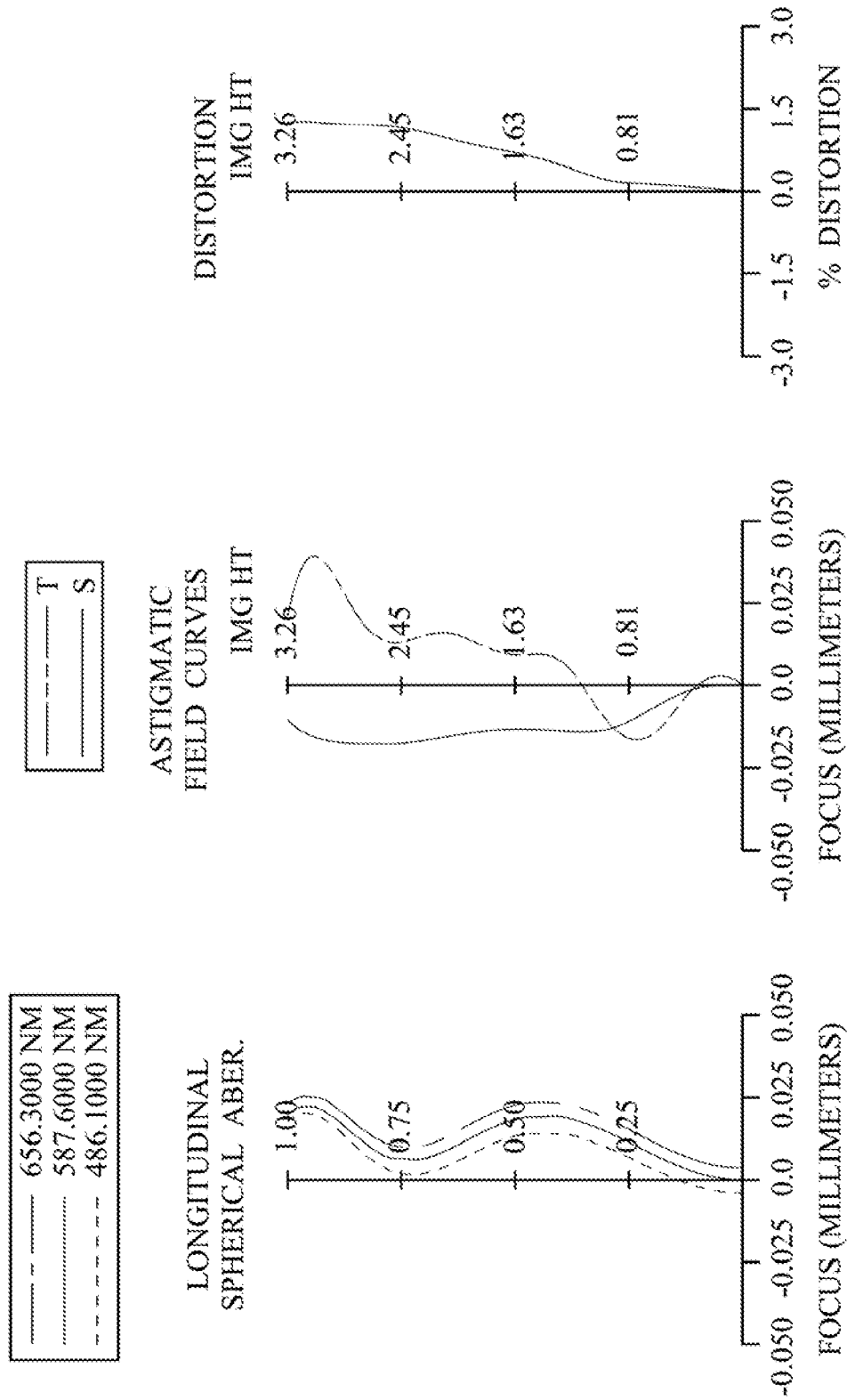
FIG. 2 shows spherical aberration curves, astigmatic field curves and a distortion curve of the optical photographing lens system according to the 1st embodiment.

FIG. 1 is a schematic view of an optical photographing lens system according to the 1st embodiment of the present disclosure. FIG. 2 shows spherical aberration curves, astigmatic field curves and a distortion curve of the optical photographing lens system according to the 1st embodiment. In FIG. 1, the optical photographing lens system includes, in order from an object side to an image side, an aperture stop 100, a first lens element 110, a second lens element 120, a third lens element 130, a fourth lens element 140, a fifth lens element 150, a sixth lens element 160, an IR-cut filter 180 and an image plane 170.

The first lens element 110 with positive refractive power has a convex object-side surface 111 and a concave image-side surface 112. The first lens element 110 is made of plastic material and has the object-side surface 111 and the image-side surface 112 being aspheric.

The second lens element 120 with positive refractive power has a convex object-side surface 121 and a convex image-side surface 122. The second lens element 120 is made of plastic material and has the object-side surface 121 and the image-side surface 122 being aspheric.

The third lens element 130 with negative refractive power has a concave object-side surface 131 and a concave image-side surface 132. The third lens element 130 is made of plastic material and has the object-side surface 131 and the image-side surface 132 being aspheric.

The fourth lens element 140 with positive refractive power has a convex object-side surface 141 and a concave image-side surface 142 wherein the object-side surface 141 changes from convex at a paraxial region thereof to concave at a peripheral region thereof, and the image-side surface 142 changed from concave at a paraxial region thereof to convex at a peripheral region thereof. The fourth lens element 140 is made of plastic material and has the object-side surface 141 and the image-side surface 142 being aspheric.

The fifth lens element 150 with positive refractive power has a concave object-side surface 151 and a convex image-side surface 152. The fifth lens element 150 is made of plastic material and has the object-side surface 151 and the image-side surface 152 being aspheric.

The sixth lens element 160 with negative refractive power has a concave object-side surface 161 and a concave image-side surface 162, wherein the image-side surface 162 changes from concave at a paraxial region thereof to convex at a peripheral region thereof. The sixth lens element 160 is made of plastic material and has the object-side surface 161 and the image-side surface 162 being aspheric.

The IR-cut filter 180 is made of plastic material which located between the sixth lens element 160 and the image plane 170 and will not affect the focal length of the optical photographing lens system.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius:

k is the conic coefficient; and

Ai is the i-th aspheric coefficient.

In the optical photographing lens system according to the 1st embodiment, when a focal length of the optical photographing lens system is f, an f-number of the optical photographing lens system is Fno, and half of the maximal field of view of the optical photographing lens system is HFOV, these parameters have the following values:

f=4.19 mm;

Fno=2.25; and

HFOV=37.5 degrees.

In the optical photographing lens system according to the 1st embodiment, when an Abbe number of the first lens element 110 is V1, and an Abbe number of the third lens element 130 is V3, the following relationship is satisfied:

$V3/V1=0.43$.

In the optical photographing lens system according to the 1st embodiment, when a central thickness of the second lens element 120 is CT2, a central thickness of the third lens element 130 is CT3, and a central thickness of the fourth lens element 140 is CT4, the following relationship is satisfied:

$CT3/CT2=0.48$; and $CT3+CT4=0.552$ mm.

In the optical photographing lens system according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, and an axial distance between the fourth lens element 140 and the fifth lens element 150 is T45, the following relationship is satisfied:

$(T12+T23)/(T34+T45)=0.25$.

Figure 21:
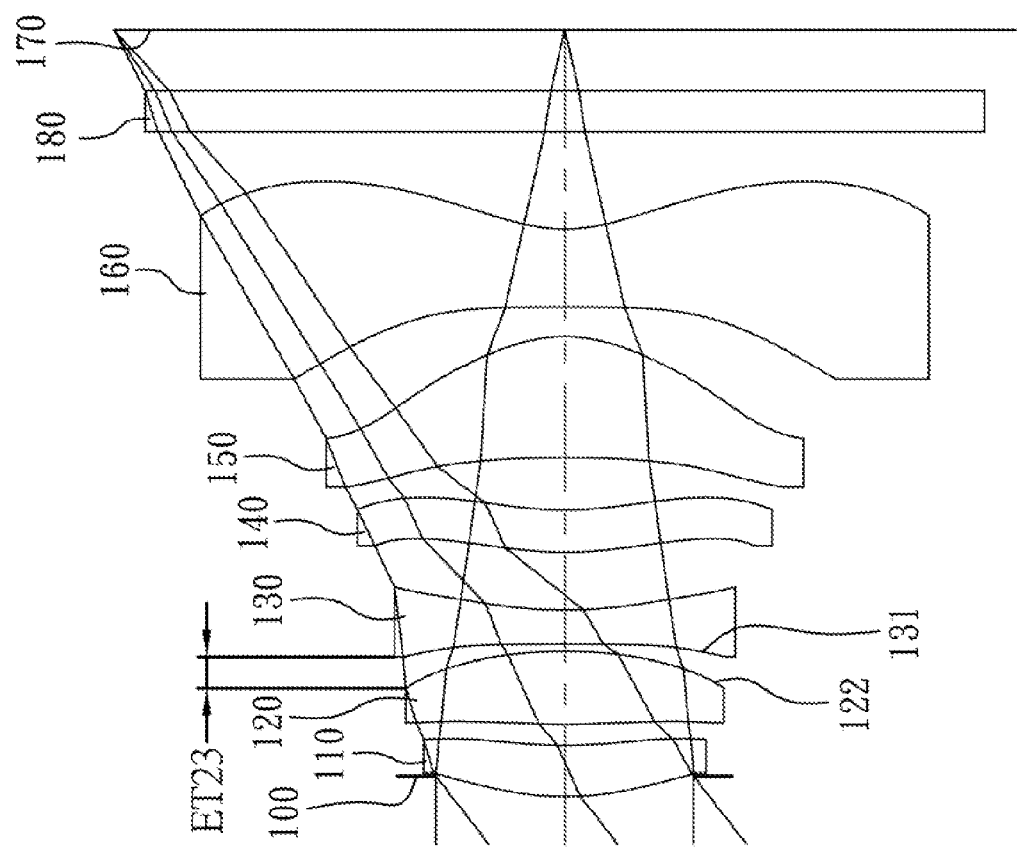
FIG. 21 shows a distance in parallel with the optical axis between a maximum effective diameter position on the image-side surface of the second lens element and a maximum effective diameter position on the object-side surface of the third lens element of the optical photographing lens system as illustrated in FIG. 1.

FIG. 21 shows a distance in parallel with the optical axis between a maximum effective diameter position on the image-side surface 122 of the second lens element 120 and a maximum effective diameter position on the object-side surface 131 of the third lens element 130 of the optical photographing lens system illustrated in FIG. 1. In FIG. 21, when the distance in parallel with the optical axis between a maximum effective diameter position on the image-side surface 122 of the second lens element 120 and a maximum effective diameter position on the object-side surface 131 of the third lens element 130 is ET23, and an axial distance between the second lens element 120 and the third lens element 130 is T23, the following relationship is satisfied:

$T23/ET23=0.24$.

In the optical photographing lens system according to the 1st embodiment, when a curvature radius of the object-side surface 121 of the second lens element 120 is R3, and a curvature radius of the image-side to surface 122 of the second lens element 120 is R4, the following relationship is satisfied:

$(R3+R4)/(R3-R4)=0.25$.

In the optical photographing lens system according to the 1st embodiment, when the focal length of the optical photographing lens system is f, a curvature radius of the object-side surface 141 of the fourth lens element 140 is R7, a focal length of the first lens element 110 is f1 a focal length of the second lens element 120 is f2, and a focal length of the fourth lens element 140 is f4, the following relationships are satisfied:

$f/R7=1.65$:

$f2/f1=0.40$;

$f/f4=0.05$; and $(f/f1)/((f/f2)+(f/f4))=0.38$.

The detailed optical data of the 1st embodiment are shown in Table 1 and the aspheric surface data are shown in Table 2 below.

TABLE 1

1st Embodiment
f = 4.19 mm, Fno = 2.25, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.148 | | | | |
| 2 | Lens 1 | 2.205 (ASP) | 0.371 | Plastic | 1.544 | 55.9 | 9.78 |
| 3 | | 3.543 (ASP) | 0.151 | | | | |
| 4 | Lens 2 | 5.497 (ASP) | 0.524 | Plastic | 1.535 | 56.3 | 3.92 |
| 5 | | −3.278 (ASP) | 0.053 | | | | |
| 6 | Lens 3 | −20.571 (ASP) | 0.250 | Plastic | 1.634 | 23.8 | −4.28 |
| 7 | | 3.143 (ASP) | 0.418 | | | | |
| 8 | Lens 4 | 2.544 (ASP) | 0.302 | Plastic | 1.634 | 23.8 | 77.42 |
| 9 | | 2.559 (ASP) | 0.384 | | | | |
| 10 | Lens 5 | −6.734 (ASP) | 0.874 | Plastic | 1.544 | 55.9 | 2.09 |
| 11 | | −1.018 (ASP) | 0.214 | | | | |
| 12 | Lens 6 | −18.113 (ASP) | 0.563 | Plastic | 1.535 | 56.3 | −1.93 |
| 13 | | 1.105 (ASP) | 0.700 | | | | |
| 14 | IR-cut filter | Plano | 0.300 | Glass | 1.517 | 64.2 | — |
| 15 | | Plano | 0.439 | | | | |
| 16 | Image | Plano | — | | | | |

Note:
Reference wavelength (d-line) is 587.6 nm.

TABLE 2

Aspheric Coefficients

| Surface # | 2 | 3 | 4 | 5 | 6 | 7 |
|---|---|---|---|---|---|---|
| k = | −1.5890E+00 | −1.4380E+01 | −7.5960E+01 | −1.4590E+01 | −8.0867E−14 | 7.2065E−01 |
| A4 = | −1.8071E−02 | −7.1085E−02 | −6.7691E−02 | −1.9360E−02 | 2.5729E−02 | −6.3063E−02 |
| A6 = | −1.5967E−02 | −1.8911E−02 | −2.6848E−02 | −1.5316E−01 | −1.2317E−01 | 6.7563E−02 |
| A8 = | 2.1813E−02 | 1.6202E−02 | 5.9244E−02 | 2.6367E−01 | 1.0096E−01 | −1.3507E−01 |
| A10 = | −4.6214E−02 | 2.7698E−02 | 1.1607E−02 | −2.2422E−01 | −6.4078E−02 | 1.2638E−01 |
| A12 = | 1.8242E−02 | −4.4151E−02 | −2.8157E−02 | 9.6850E−02 | 3.3307E−02 | −5.5035E−02 |
| A14 = | 4.5905E−04 | 1.7411E−02 | 3.3458E−03 | −1.9795E−02 | −6.5030E−03 | 1.0135E−02 |

| Surface # | 8 | 9 | 10 | 11 | 12 | 13 |
|---|---|---|---|---|---|---|
| k = | −8.1200E+00 | −1.4557E+01 | −7.6003E+01 | −3.8220E+00 | −7.4034E+00 | −5.4420E+00 |
| A4 = | −9.0656E−02 | −4.0141E−02 | −9.2172E−03 | −3.3132E−02 | 1.7465E−02 | −5.9954E−02 |
| A6 = | 3.1546E−02 | −3.4661E−02 | −1.7370E−02 | 7.4665E−04 | −1.3466E−01 | 1.6331E−02 |
| A8 = | 7.9936E−03 | 4.0779E−02 | −1.9051E−02 | −2.2051E−02 | 1.1126E−01 | −2.5123E−03 |
| A10 = | −2.2982E−02 | −2.4735E−02 | 3.0515E−02 | 2.7584E−02 | −4.5030E−02 | 1.2270E−04 |
| A12 = | 1.1851E−02 | 7.7689E−03 | −1.4032E−02 | −1.0737E−02 | 9.8398E−03 | 1.2152E−05 |
| A14 = | −2.3432E−03 | −1.0589E−03 | 2.9893E−03 | 1.8152E−03 | −1.0866E−03 | −1.5654E−06 |
| A16 = | | 3.1959E−05 | −2.6721E−04 | −1.2006E−04 | 4.6050E−05 | 3.8326E−08 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
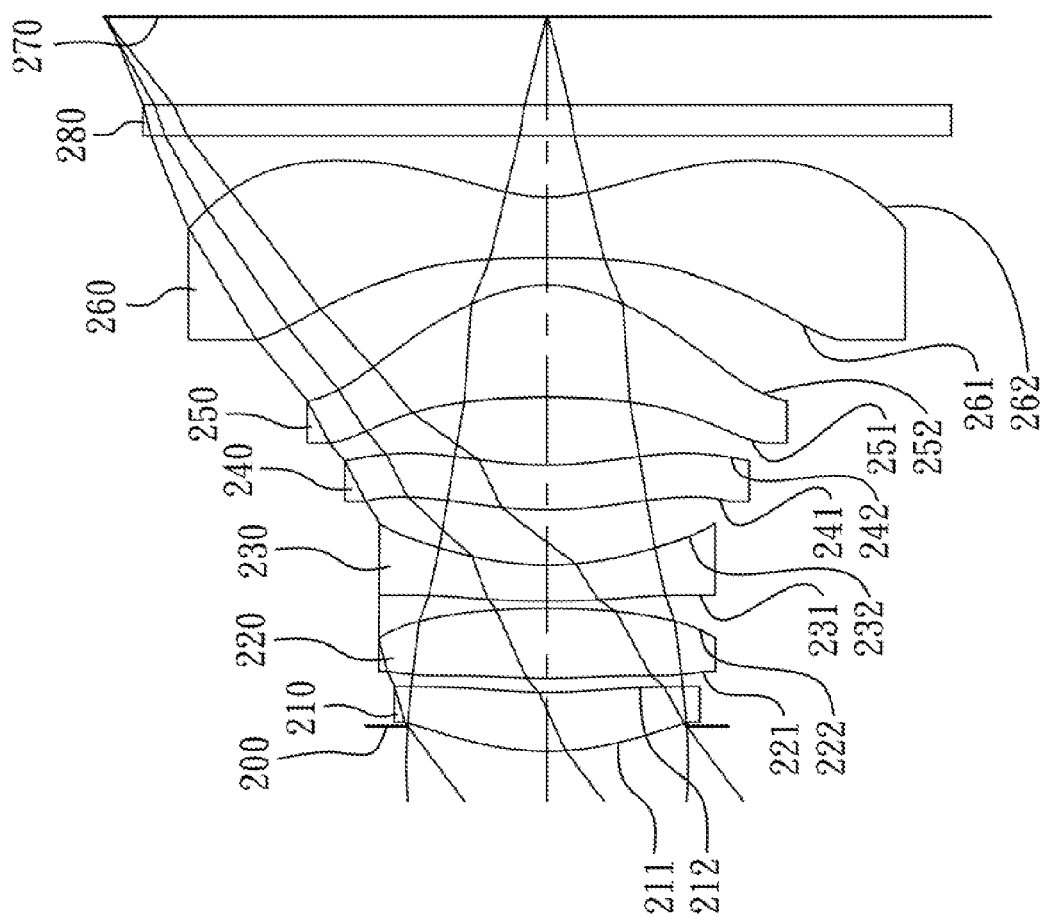
FIG. 3 is a schematic view of an optical photographing lens system according to the 2nd embodiment of the present disclosure.
Figure 4:
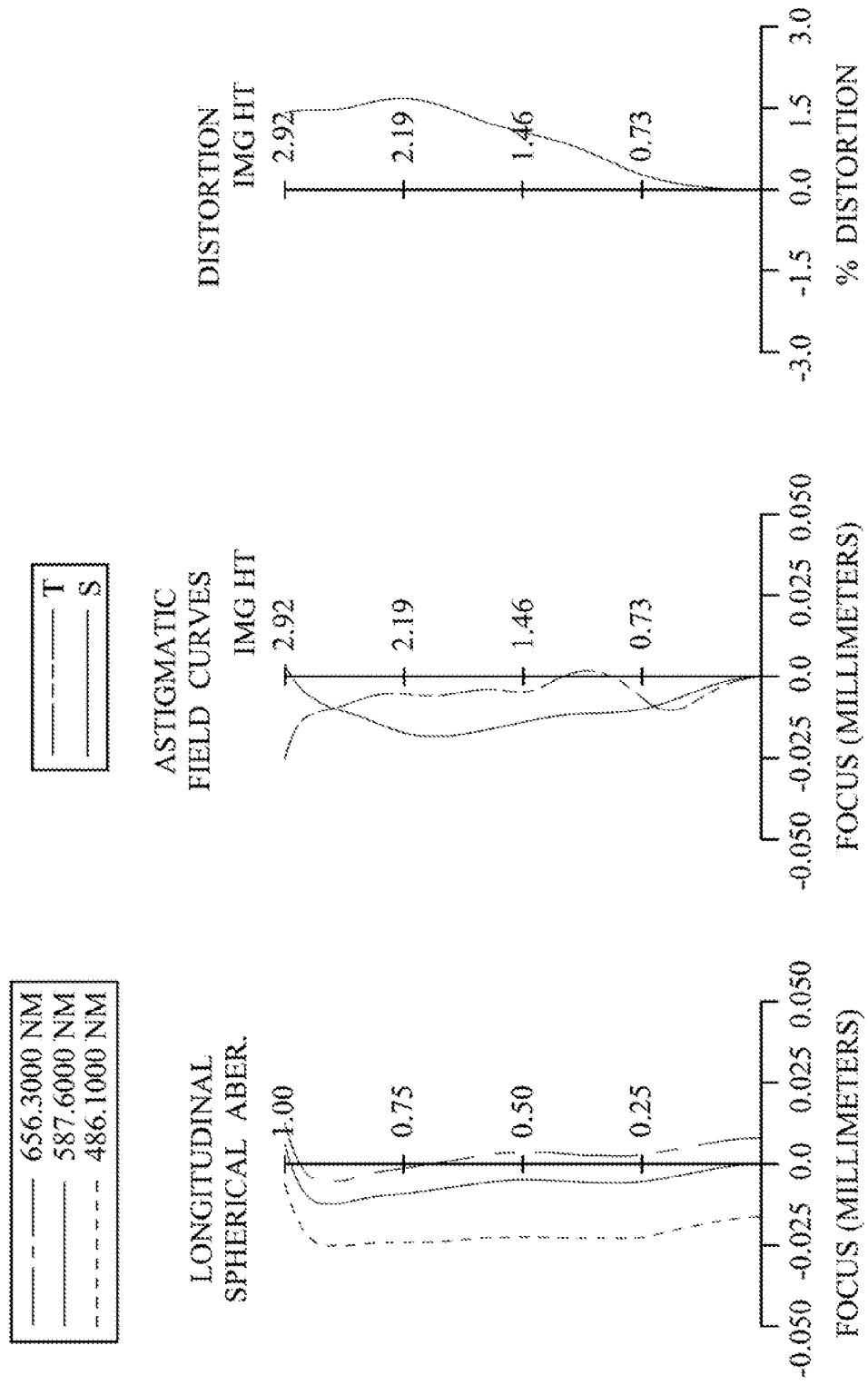
FIG. 4 shows spherical aberration curves, astigmatic field curves and a distortion curve of the optical photographing lens system according to the 2nd embodiment.

FIG. 3 is a schematic view of an optical photographing lens system according to the 2nd embodiment of the present disclosure. FIG. 4 shows spherical aberration curves, astigmatic field curves and a distortion curve of the optical photographing lens system according to the 2nd embodiment. In FIG. 3, the optical photographing lens system includes, in order from an object side to an image side, an aperture stop 200, a first lens element 210 a second lens element 220, a third lens element 230, a fourth lens element 240, a fifth lens element 250, a sixth lens element 260, an IR-cut filter 280 and an image plane 270.

The first lens element 210 with positive refractive power has a convex object-side surface 211 and a concave image-side surface 212. The first lens element 210 is made of plastic material and has the object-side surface 211 and the image-side surface 212 being aspheric.

The second lens element 220 with positive refractive power has a convex object-side surface 221 and a convex image-side surface 222. The second lens element 220 is made of plastic material and has the object-side surface 221 and the image-side surface 222 being aspheric.

The third lens element 230 with negative refractive power has a convex object-side surface 231 and a concave image-side surface 232. The third lens element 230 is made of plastic material and has the object-side surface 231 and the image-side surface 232 being aspheric.

The fourth lens element 240 with positive refractive power has a convex object-side surface 241 and a concave image-side surface 242, wherein the object-side surface 241 changes from convex at a paraxial region thereof to concave at a peripheral region thereof, and the image-side surface 242 changed from concave at a paraxial region thereof to convex at a peripheral region thereof. The fourth lens element 240 is made of plastic material and has the object-side surface 241 and the image-side surface 242 being aspheric.

The fifth lens element 250 with positive refractive power has a concave object-side surface 251 and a convex image-side surface 252. The fifth lens element 250 is made of plastic material and has the object-side surface 251 and the image-side surface 252 being aspheric.

The sixth lens element 260 with negative refractive power has a concave object-side surface 261 and a concave image-side surface 262, wherein the image-side surface 262 changes from concave at a paraxial region thereof to convex at a peripheral region thereof. The sixth lens element 260 is made of plastic material and has the object-side surface 261 and the image-side surface 262 being aspheric.

The IR-cut filter 280 is made of plastic material which located between the sixth lens element 260 and the image plane 270, and will not affect the focal length of the optical photographing lens system.

The detailed optical data of the 2nd embodiment are shown in Table 3 and the aspheric surface data are shown in Table 4 below.

TABLE 3

2nd Embodiment
f = 3.82 mm, Fno = 2.08, HFOV = 37.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.165 | | | | |
| 2 | Lens 1 | 1.925 (ASP) | 0.389 | Plastic | 1.544 | 55.9 | 7.26 |
| 3 | | 3.485 (ASP) | 0.093 | | | | |
| 4 | Lens 2 | 4.947 (ASP) | 0.456 | Plastic | 1.535 | 56.3 | 4.84 |
| 5 | | −5.252 (ASP) | 0.050 | | | | |
| 6 | Lens 3 | 6.000 (ASP) | 0.240 | Plastic | 1.640 | 23.3 | −5.00 |
| 7 | | 2.053 (ASP) | 0.360 | | | | |
| 8 | Lens 4 | 2.362 (ASP) | 0.301 | Plastic | 1.640 | 23.3 | 38.22 |
| 9 | | 2.485 (ASP) | 0.444 | | | | |
| 10 | Lens 5 | −5.322 (ASP) | 0.743 | Plastic | 1.544 | 55.9 | 1.76 |
| 11 | | −0.853 (ASP) | 0.175 | | | | |
| 12 | Lens 6 | −6.833 (ASP) | 0.405 | Plastic | 1.535 | 56.3 | −1.61 |
| 13 | | 1.002 (ASP) | 0.400 | | | | |
| 14 | IR-cut filter | Plano | 0.210 | Glass | 1.517 | 64.2 | — |
| 15 | | Plano | 0.579 | | | | |
| 16 | Image | Plano | — | | | | |

Note:
Reference wavelength (d-line) is 587.6 nm.

TABLE 4

Aspheric Coefficients

| Surface # | 2 | 3 | 4 | 5 | 6 | 7 |
|---|---|---|---|---|---|---|
| k = | −1.0174E+00 | −2.1284E+01 | −4.6314E+01 | −5.4375E+01 | −2.4903E+01 | 8.7863E−01 |
| A4 = | −1.7602E−02 | −1.0497E−01 | −1.2414E−01 | −7.7413E−03 | 5.6321E−02 | −9.1202E−02 |
| A6 = | −4.1251E−02 | −4.3461E−02 | −5.6070E−02 | −3.1641E−01 | −2.3412E−01 | 1.4683E−01 |
| A8 = | 8.3898E−02 | 3.3840E−02 | 2.0493E−01 | 7.1063E−01 | 2.8028E−01 | −3.6827E−01 |
| A10 = | −1.9571E−01 | 1.7413E−01 | 5.6039E−02 | −8.0904E−01 | −2.5523E−01 | 4.4797E−01 |
| A12 = | 1.7598E−01 | −1.5580E−01 | −1.4936E−01 | 4.7997E−01 | 1.6084E−01 | −2.6309E−01 |
| A14 = | −6.0291E−02 | 2.6001E−02 | 3.1744E−02 | −1.2389E−01 | −4.1813E−02 | 6.5169E−02 |

| Surface # | 8 | 9 | 10 | 11 | 12 | 13 |
|---|---|---|---|---|---|---|
| k = | −5.0989E+00 | −1.5503E+01 | −2.4383E+01 | −3.8078E+00 | 9.7893E+00 | −6.5718E+00 |
| A4 = | −1.4425E−01 | −4.9393E−02 | −3.2627E−02 | −6.2222E−02 | 4.2056E−02 | −9.7759E−02 |
| A6 = | 5.7586E−02 | −7.2288E−02 | −3.5754E−02 | −3.1991E−03 | −2.6711E−01 | 3.5159E−02 |
| A8 = | 2.7950E−02 | 1.1088E−01 | −5.2792E−02 | −6.0694E−02 | 3.0325E−01 | −6.7687E−03 |
| A10 = | −8.2107E−02 | −8.9380E−02 | 1.1025E−01 | 9.9926E−02 | −1.6401E−01 | 3.1772E−04 |
| A12 = | 5.7236E−02 | 3.7784E−02 | −6.7816E−02 | −5.1849E−02 | 4.7313E−02 | 5.6758E−05 |
| A14 = | −1.4877E−02 | −6.6243E−03 | 1.9276E−02 | 1.1715E−02 | −6.9887E−03 | −7.0638E−06 |
| A16 = | | 2.8586E−04 | −2.1403E−03 | −9.9470E−04 | 4.1724E−04 | 2.2104E−07 |

In the optical photographing lens system according to the 2nd embodiment, the definitions of f, Fno, HFOV, V1, V3, CT2, CT3, CT4, T12, T23, T34, T45, ET23, R3, R4, R7, f1, f2 and f4 are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 3.82 | T23/ET23 | 0.17 |
| Fno | 2.08 | (R3 + R4)/(R3 − R4) | −0.03 |
| HFOV (deg.) | 37.1 | f/R7 | 1.62 |
| V3/V1 | 0.42 | f2/f1 | 0.67 |
| CT3/CT2 | 0.53 | f/f4 | 0.10 |
| CT3 + CT4 (mm) | 0.541 | (f/f1)/((f/f2) + (f/f4)) | 0.59 |
| (T12 + T23)/(T34 + T45) | 0.18 | | |

3rd Embodiment

Figure 5:
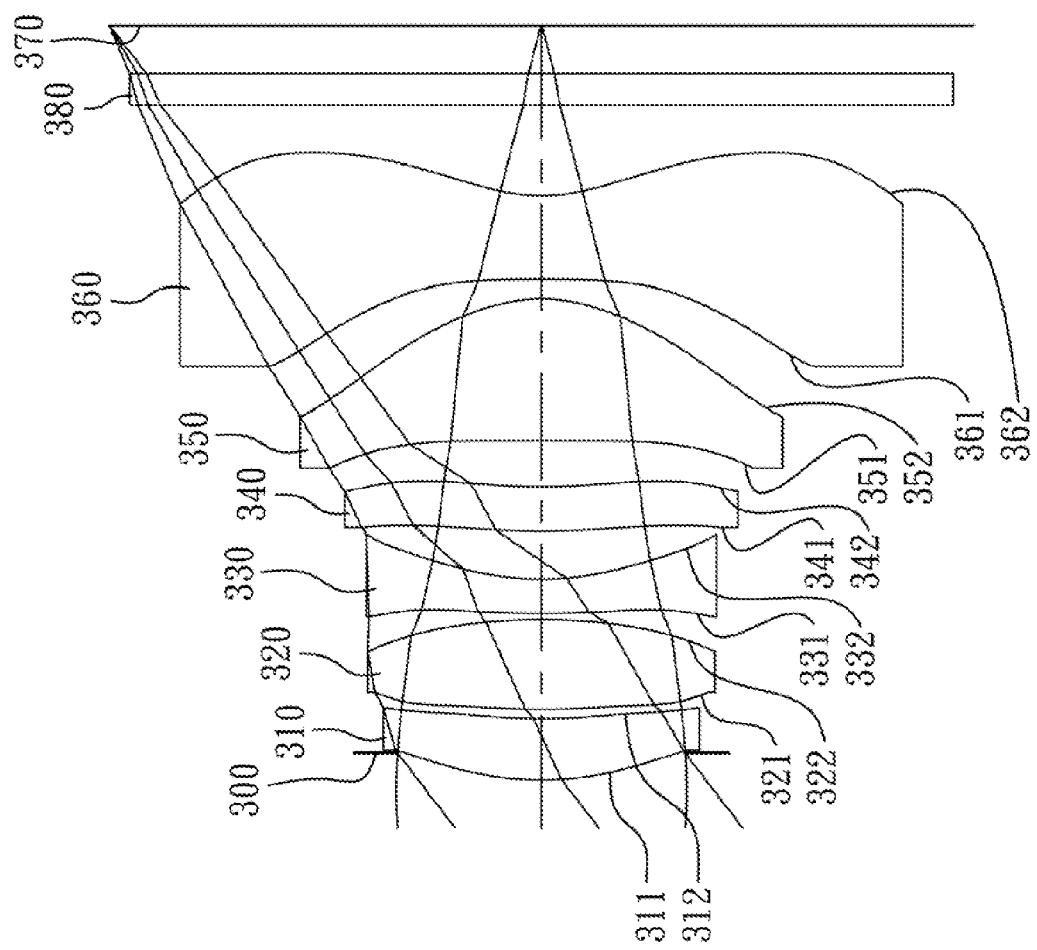
FIG. 5 is a schematic view of an optical photographing lens system according to the 3rd embodiment of the present disclosure.
Figure 6:
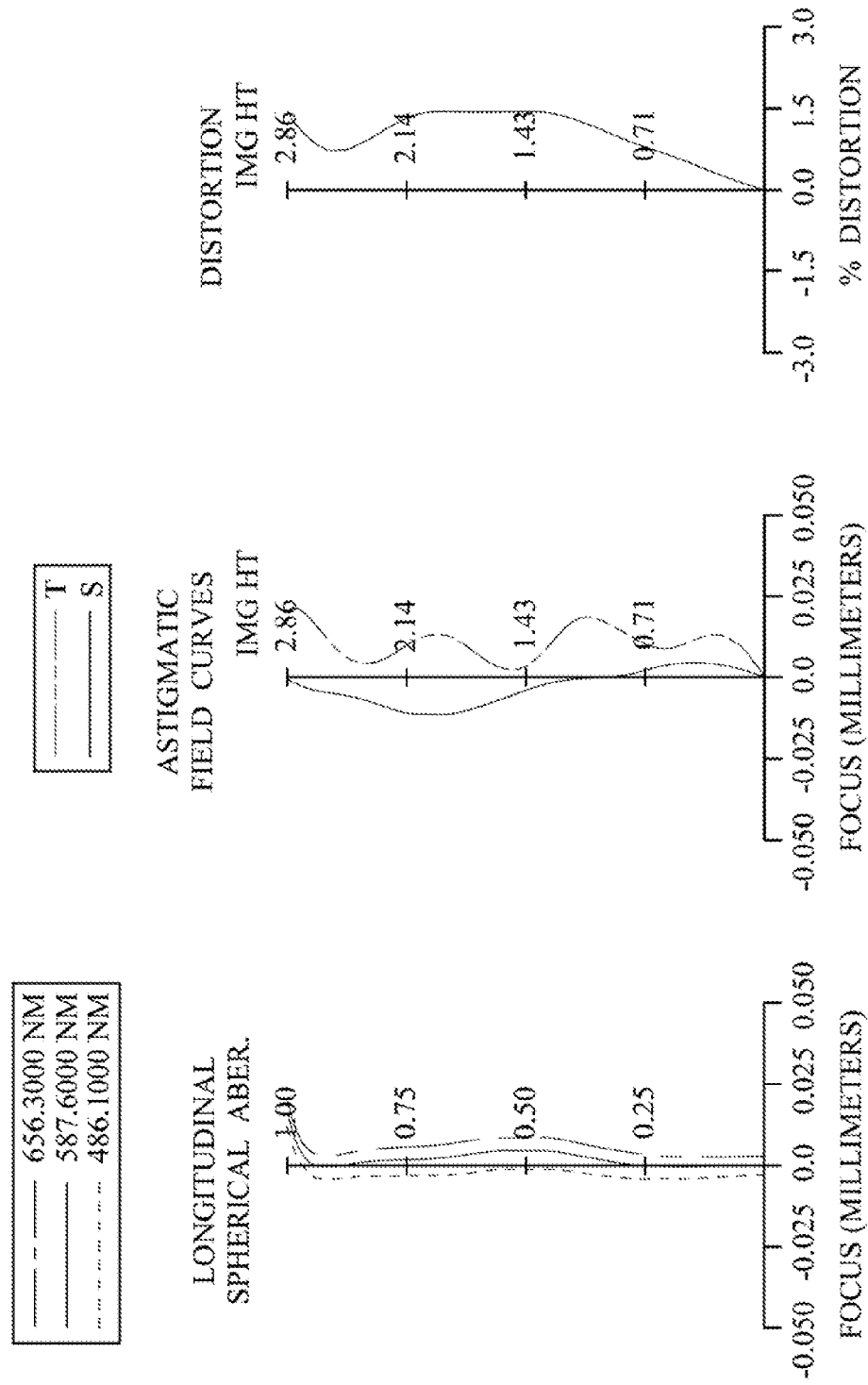
FIG. 6 shows spherical aberration curves, astigmatic field curves and a distortion curve of the optical photographing lens system according to the 3rd embodiment.

FIG. 5 is a schematic view of an optical photographing lens system according to the 3rd embodiment of the present disclosure. FIG. 6 shows spherical aberration curves, astigmatic field curves and a distortion curve of the optical photographing lens system according to the 3rd embodiment. In FIG. 5, the optical photographing lens system includes, in order from an object side to an image side, an aperture stop 300, a first lens element 310, a second lens element 320, a third lens element 330, a fourth lens element 340, a fifth lens element 350, a sixth lens element 360, an IR-cut filter 380 and an image plane 370.

The first lens element 310 with positive refractive power has a convex object-side surface 311 and a concave image-side surface 312. The first lens element 310 is made of plastic material and has the object-side surface 311 and the image-side surface 312 being aspheric.

The second lens element 320 with positive refractive power has a convex object-side surface 321 and a convex image-side surface 322. The second lens element 320 is made of plastic material and has the object-side surface 321 and the image-side surface 322 being aspheric.

The third lens element 330 with negative refractive power has a convex object-side surface 331 and a concave image-side surface 332. The third lens element 330 is made of plastic material and has the object-side surface 331 and the image-side surface 332 being aspheric.

The fourth lens element 340 with negative refractive power has a convex object-side surface 341 and a concave image-side surface 342, wherein the object-side surface 341 changes from convex at a paraxial region thereof to concave at a peripheral region thereof, and the image-side surface 342 changed from concave at a paraxial region thereof to convex at a peripheral region thereof. The fourth lens element 340 is made of plastic material and has the object-side surface 341 and the image-side surface 342 being aspheric.

The fifth lens element 350 with positive refractive power has a concave object-side surface 351 and a convex image-side surface 352. The fifth lens element 350 is made of plastic material and has the object-side surface 351 and the image-side surface 352 being aspheric.

The sixth lens element 360 with negative refractive power has a concave object-side surface 361 and a concave image-side surface 362, wherein the image-side surface 362 changes from concave at a paraxial region thereof to convex at a peripheral region thereof. The sixth lens element 360 is made of plastic material and has the object-side surface 361 and the image-side surface 362 being aspheric.

The IR-cut filter 380 is made of plastic material which located between the sixth lens element 360 and the image plane 370, and will not affect the focal length of the optical photographing lens system.

The detailed optical data of the 3rd embodiment are shown in Table 5 and the aspheric surface data are shown in Table 6 below.

TABLE 5

3rd Embodiment
f = 3.71 mm, Fno = 1.95, HFOV = 37.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.179 | | | | |
| 2 | Lens 1 | 1.994 (ASP) | 0.405 | Plastic | 1.544 | 55.9 | 8.72 |
| 3 | | 3.193 (ASP) | 0.063 | | | | |
| 4 | Lens 2 | 4.372 (ASP) | 0.592 | Plastic | 1.544 | 55.9 | 3.62 |
| 5 | | −3.407 (ASP) | 0.040 | | | | |
| 6 | Lens 3 | 6.175 (ASP) | 0.230 | Plastic | 1.640 | 23.3 | −4.07 |
| 7 | | 1.806 (ASP) | 0.313 | | | | |
| 8 | Lens 4 | 3.909 (ASP) | 0.298 | Plastic | 1.640 | 23.3 | −80.82 |
| 9 | | 3.526 (ASP) | 0.307 | | | | |
| 10 | Lens 5 | −65.158 (ASP) | 0.938 | Plastic | 1.544 | 55.9 | 1.85 |
| 11 | | −0.994 (ASP) | 0.127 | | | | |
| 12 | Lens 6 | −8.401 (ASP) | 0.555 | Plastic | 1.535 | 56.3 | −1.74 |
| 13 | | 1.069 (ASP) | 0.600 | | | | |
| 14 | IR-cut filter | Plano | 0.210 | Glass | 1.517 | 64.2 | — |
| 15 | | Plano | 0.316 | | | | |
| 16 | Image | Plano | — | | | | |

Note:
Reference wavelength (d-line) is 587.6 nm.

TABLE 6

Aspheric Coefficients

| Surface # | 2 | 3 | 4 | 5 | 6 | 7 |
|---|---|---|---|---|---|---|
| k = | −3.4065E−01 | −1.8109E+01 | −5.6143E+01 | −2.0455E+01 | −2.9992E+01 | 6.8476E−02 |
| A4 = | −2.5943E−02 | −1.0539E−01 | −7.5486E−02 | 4.6449E−02 | 2.1722E−02 | −1.4440E−01 |
| A6 = | −3.5293E−02 | −3.0209E−02 | −7.9038E−02 | −3.4545E−01 | −2.2000E−01 | 2.0038E−01 |
| A8 = | 8.2406E−02 | 4.2372E−02 | 1.9402E−01 | 6.9635E−01 | 2.7555E−01 | −3.8947E−01 |
| A10 = | −1.8162E−01 | 1.7337E−01 | 6.7700E−02 | −8.0714E−01 | −2.6540E−01 | 4.3655E−01 |
| A12 = | 1.6371E−01 | −1.4972E−01 | −1.4319E−01 | 4.8645E−01 | 1.5423E−01 | −2.4577E−01 |
| A14 = | −5.7544E−02 | 2.0413E−02 | 3.4651E−02 | −1.1695E−01 | −3.3149E−02 | 5.6725E−02 |

| Surface # | 8 | 9 | 10 | 11 | 12 | 13 |
|---|---|---|---|---|---|---|
| k = | −2.1068E+01 | −3.0000E+01 | −1.0000E+00 | −4.9155E+00 | −2.9930E+01 | −5.5534E+00 |
| A4 = | −1.2744E−01 | −8.8885E−02 | −5.7621E−03 | −9.1487E−02 | 7.8818E−03 | −8.6567E−02 |
| A6 = | 9.7937E−02 | −1.3663E−02 | −4.8728E−02 | 4.7593E−02 | −2.7353E−01 | 2.9808E−02 |
| A8 = | −7.4759E−03 | 8.4725E−02 | −2.8625E−02 | −8.6995E−02 | 3.0771E−01 | −5.6952E−03 |
| A10 = | −7.9081E−02 | −9.0974E−02 | 9.5979E−02 | 9.8451E−02 | −1.6409E−01 | 3.1283E−04 |
| A12 = | 7.1594E−02 | 4.0596E−02 | −7.0771E−02 | −5.0102E−02 | 4.7177E−02 | 3.9437E−05 |
| A14 = | −2.0004E−02 | −6.7532E−03 | 2.0637E−02 | 1.2122E−02 | −6.9801E−03 | −6.1936E−06 |
| A16 = | | 2.8586E−04 | −1.9036E−03 | −1.1441E−03 | 4.1675E−04 | 2.8601E−07 |

In the optical photographing lens system according to the 3rd embodiment, the definitions of f, Fno, HFOV, V1, V3, CT2, CT3, CT4, T12, T23, T34, T45, ET23, R3, R4, R7, f1, f2 and f4 are the same as those stated in the 1st embodiment with corresponding values for the 3rd embodiment. Moreover, these parameters can be calculated from Table 5 and Table 6 as the following values and satisfy the following relationships:

| f (mm) | 3.71 | T23/ET23 | 0.17 |
|---|---|---|---|
| Fno | 1.95 | (R3 + R4)/R3 − R4) | 0.12 |
| HFOV (deg.) | 37.2 | f/R7 | 0.95 |
| V3/V1 | 0.42 | f2/f1 | 0.41 |
| CT3/CT2 | 0.39 | f/f4 | −0.05 |
| CT3 + CT4 (mm) | 0.528 | (f/f1)/((f/f2) + (f/f4)) | 0.43 |
| (T12 + T23)/(T34 + T45) | 0.17 | | |

4th Embodiment

Figure 7:
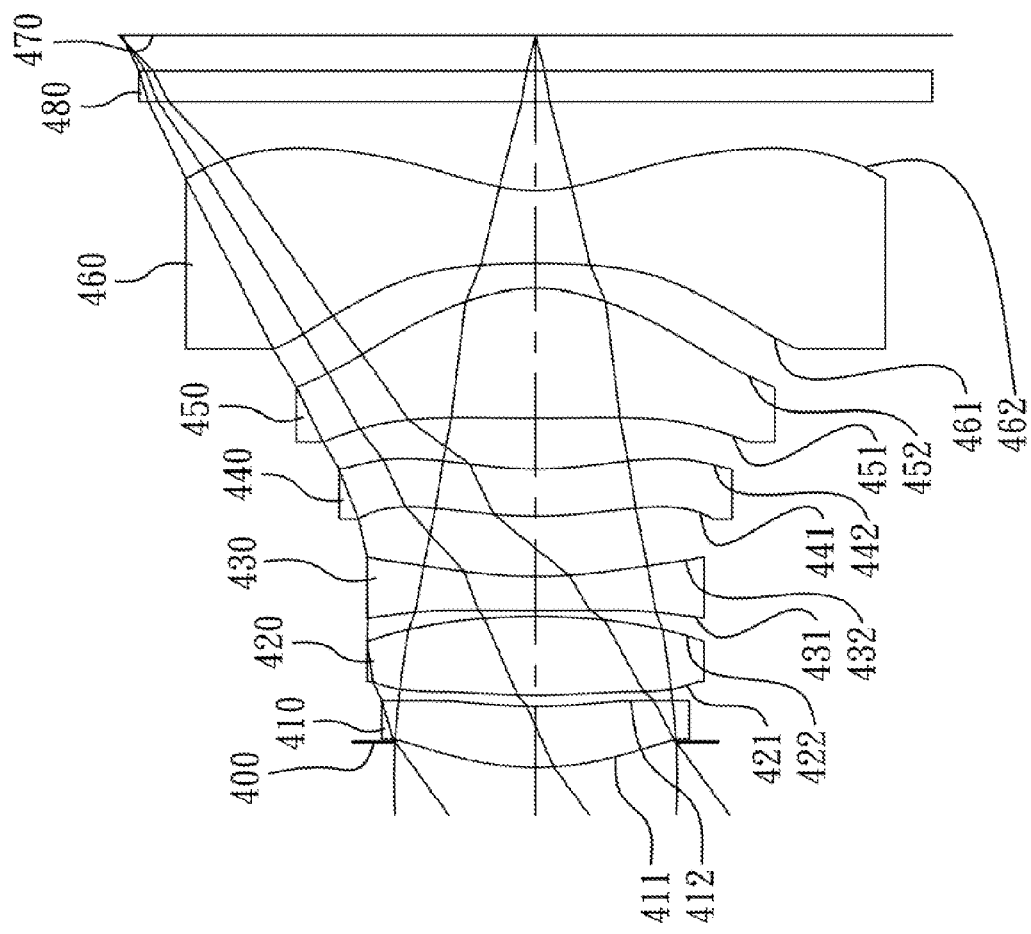
FIG. 7 is a schematic view of an optical photographing lens system according to the 4th embodiment of the present disclosure.
Figure 8:
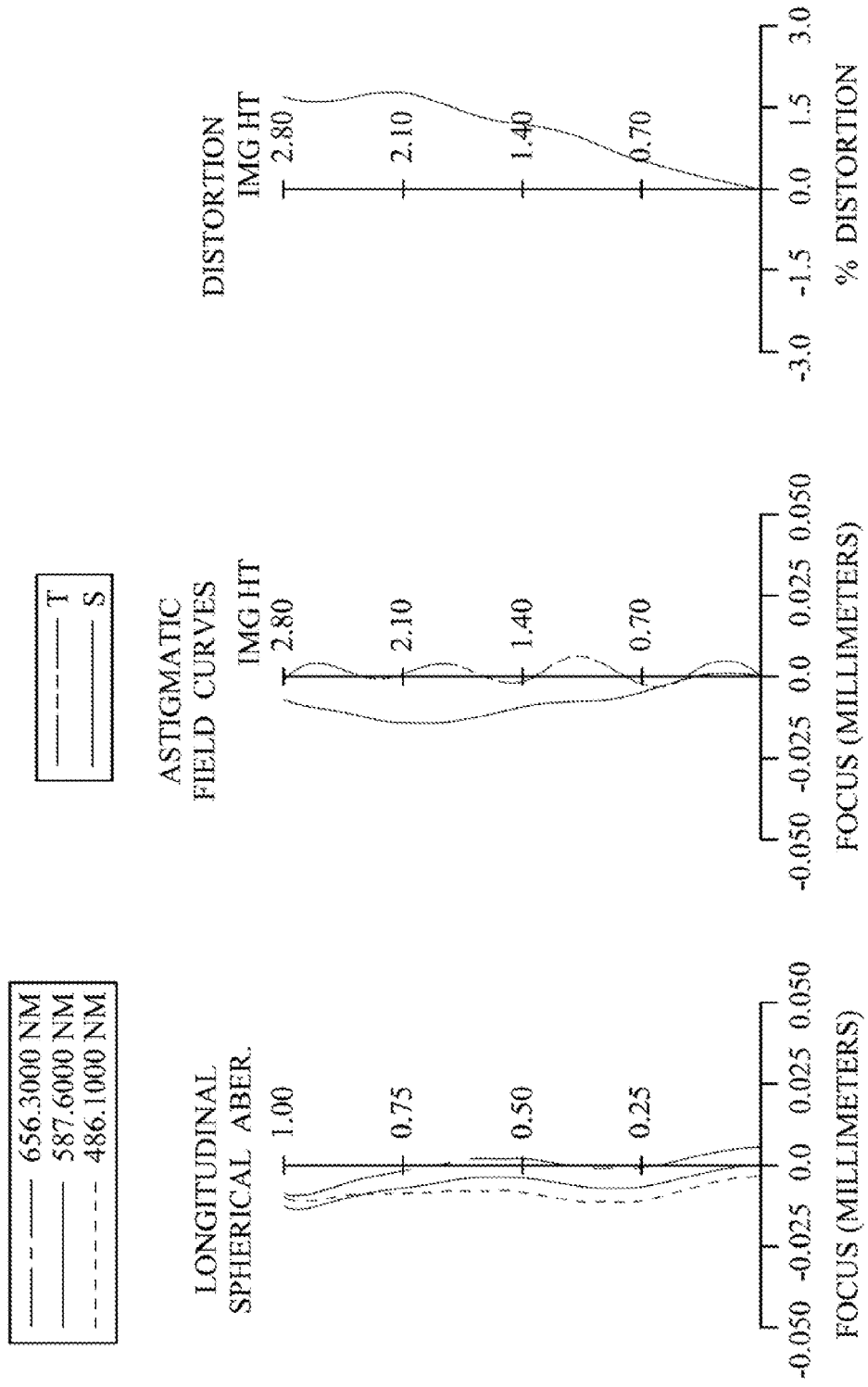
FIG. 8 shows spherical aberration curves, astigmatic field curves and a distortion curve of the optical photographing lens system according to the 4th embodiment.

FIG. 7 is a schematic view of an optical photographing lens system according to the 4th embodiment of the present disclosure. FIG. 8 shows spherical aberration curves, astigmatic field curves and a distortion curve of the optical photographing lens system according to the 4th embodiment. In FIG. 7, the optical photographing lens system includes, in order from an object side to an image side, an aperture stop 400, a first lens element 410, a second lens element 420, a third lens element 430, a fourth lens element 440, a fifth lens element 450, a sixth lens element 460, an IR-cut filter 480 and an image plane 470.

The first lens element 410 with positive refractive power has a convex object-side surface 411 and a concave image-side surface 412. The first lens element 410 is made of plastic material and has the object-side surface 411 and the image-side surface 412 being aspheric.

The second lens element 420 with positive refractive power has a convex object-side surface 421 and a convex image-side surface 422. The second lens element 420 is made of plastic material and has the object-side surface 421 and the image-side surface 422 being aspheric.

The third lens element 430 with negative refractive power has a convex object-side surface 431 and a concave image-side surface 432. The third lens element 430 is made of plastic material and has the object-side surface 431 and the image-side surface 432 being aspheric.

The fourth lens element 440 with negative refractive power has a convex object-side surface 441 and a concave image-side surface 442, wherein the object-side surface 441 changes from convex at a paraxial region thereof to concave at a peripheral region thereof, and the image-side surface 442 changed from concave at a paraxial region thereof to convex at a peripheral region thereof. The fourth lens element 440 is made of plastic material and has the object-side surface 441 and the image-side surface 442 being aspheric.

The fifth lens element 450 with positive refractive power has a convex object-side surface 451 and a convex image-side surface 452. The fifth lens element 450 is made of plastic material and has the object-side surface 451 and the image-side surface 452 being aspheric.

The sixth lens element 460 with negative refractive power has a concave object-side surface 461 and a concave image-side surface 462, wherein the image-side surface 462 changes from concave at a paraxial region thereof to convex at a peripheral region thereof. The sixth lens element 460 is made of plastic material and has the object-side surface 461 and the image-side surface 462 being aspheric.

The IR-cut filter 480 is made of plastic material which located between the sixth lens element 460 and the image plane 470, and will not affect the focal length of the optical photographing lens system.

The detailed optical data of the 4th embodiment are shown in Table 7 and the aspheric surface data are shown in Table 8 below.

TABLE 7

4th Embodiment
f = 3.79 mm, Fno = 2.00, HFOV = 36.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.172 | | | | |
| 2 | Lens 1 | 1.972 | (ASP) | 0.412 | Plastic | 1.544 | 55.9 | 8.98 |
| 3 | | 3.063 | (ASP) | 0.074 | | | | |
| 4 | Lens 2 | 4.097 | (ASP) | 0.530 | Plastic | 1.544 | 55.9 | 4.10 |
| 5 | | −4.680 | (ASP) | 0.040 | | | | |
| 6 | Lens 3 | 65.939 | (ASP) | 0.235 | Plastic | 1.650 | 21.4 | −5.23 |
| 7 | | 3.229 | (ASP) | 0.403 | | | | |
| 8 | Lens 4 | 2.661 | (ASP) | 0.323 | Plastic | 1.650 | 21.4 | −118.71 |
| 9 | | 2.449 | (ASP) | 0.345 | | | | |
| 10 | Lens 5 | 23.186 | (ASP) | 0.876 | Plastic | 1.535 | 56.3 | 1.96 |
| 11 | | −1.084 | (ASP) | 0.167 | | | | |
| 12 | Lens 6 | −5.548 | (ASP) | 0.495 | Plastic | 1.535 | 56.3 | −1.71 |
| 13 | | 1.125 | (ASP) | 0.600 | | | | |
| 14 | IR-cut filter | Plano | | 0.210 | Glass | 1.517 | 64.2 | — |
| 15 | | Plano | | 0.240 | | | | |
| 16 | Image | Plano | | — | | | | |

Note:
Reference wavelength (d-line) is 587.6 nm.

TABLE 8

Aspheric Coefficients

| Surface # | 2 | 3 | 4 | 5 | 6 | 7 |
|---|---|---|---|---|---|---|
| k = | −1.0401E+00 | −8.0270E+00 | −1.1237E+01 | −3.0000E+01 | −2.1750E+01 | 1.5270E+00 |
| A4 = | −1.8366E−02 | −1.3925E−01 | −1.3286E−01 | 1.6257E−02 | 3.3754E−02 | −7.7840E−02 |
| A6 = | −4.1218E−02 | −6.1657E−02 | −8.2290E−02 | −3.2143E−01 | −2.1823E−01 | 1.3050E−01 |
| A8 = | 8.2916E−02 | 6.6996E−02 | 2.0653E−01 | 7.0755E−01 | 2.8130E−01 | −3.5414E−01 |
| A10 = | −1.5856E−01 | 1.5204E−01 | 7.1115E−02 | −8.0550E−01 | −2.5569E−01 | 4.3857E−01 |
| A12 = | 1.0780E−01 | −1.5395E−01 | −1.4642E−01 | 4.8244E−01 | 1.5672E−01 | −2.5883E−01 |
| A14 = | −2.4996E−02 | 3.4867E−02 | 3.6653E−02 | −1.1889E−01 | −3.9538E−02 | 6.2218E−02 |

| Surface # | 8 | 9 | 10 | 11 | 12 | 13 |
|---|---|---|---|---|---|---|
| k = | −1.2631E+01 | −1.9224E+01 | −6.3092E+00 | −5.3840E+00 | 3.0000E+00 | −5.7432E+00 |
| A4 = | −1.1216E−01 | −5.7216E−02 | −3.0278E−02 | −5.2444E−02 | 1.8158E−02 | −8.9203E−02 |
| A6 = | 5.4239E−02 | −5.6625E−02 | −2.3476E−02 | 1.3855E−02 | −2.6630E−01 | 3.4362E−02 |
| A8 = | 2.3514E−03 | 1.0206E−01 | −5.4540E−02 | −7.0565E−02 | 3.0525E−01 | −7.1731E−03 |
| A10 = | −7.9048E−02 | −9.2487E−02 | 1.0642E−01 | 9.8631E−02 | −1.6395E−01 | 5.1871E−04 |
| A12 = | 5.9349E−02 | 3.8074E−02 | −6.8881E−02 | −5.1532E−02 | 4.7247E−02 | 4.4563E−05 |
| A14 = | −1.4913E−02 | −5.6360E−03 | 1.9396E−02 | 1.1855E−02 | −7.0031E−03 | −9.6562E−06 |
| A16 = | | 2.8586E−04 | −1.9341E−03 | −1.0028E−03 | 4.2034E−04 | 4.7213E−07 |

In the optical photographing lens system according to the 4th embodiment, the definitions of f, Fno, HFOV, V1, V3, CT2, CT3, CT4, T12, T23, T34, T45, ET23, R3, R4, R7, f1, f2 and f4 are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f (mm) | 3.79 | T23/ET23 | 0.25 |
| Fno | 2.00 | (R3 + R4)/R3 − R4) | −0.07 |
| HFOV (deg.) | 36.0 | f/R7 | 1.43 |
| V3/V1 | 0.38 | f2/f1 | 0.46 |
| CT3/CT2 | 0.44 | f/f4 | −0.03 |
| CT3 + CT4 (mm) | 0.558 | (f/f1)/((f/f2) + (f/f4)) | 0.47 |
| (T12 + T23)/(T34 + T45) | 0.15 | | |

5th Embodiment

Figure 9:
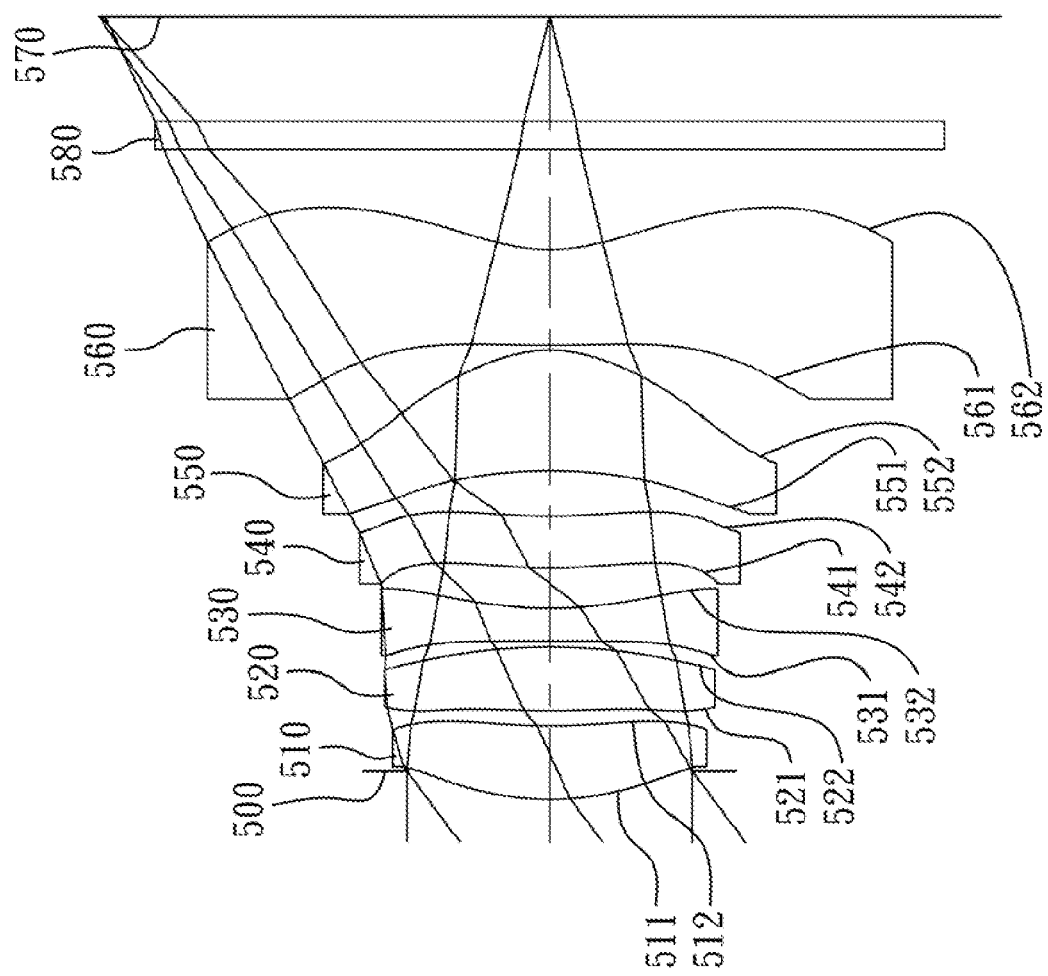
FIG. 9 is a schematic view of an optical photographing lens system according to the 5th embodiment of the present disclosure.
Figure 10:
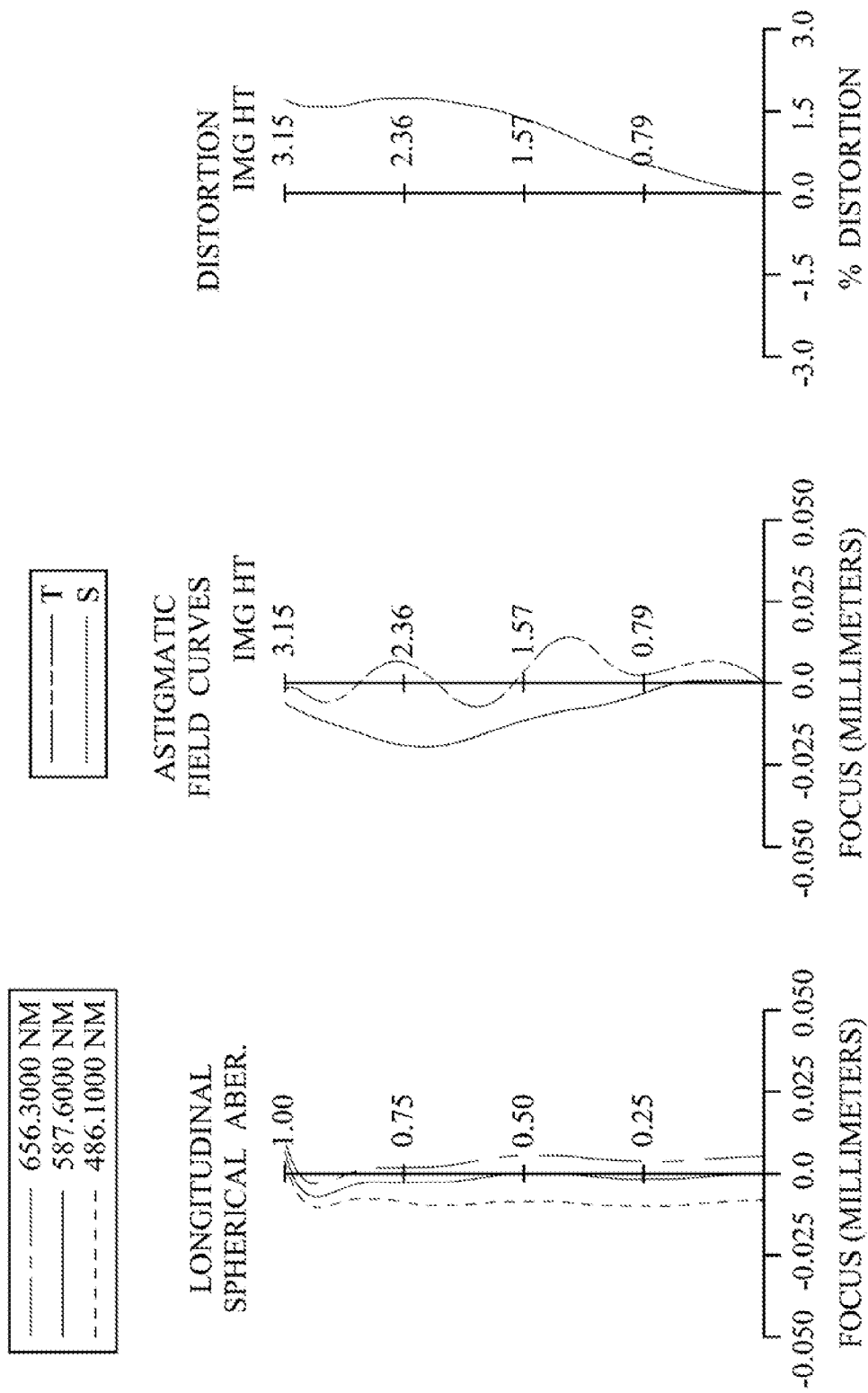
FIG. 10 shows spherical aberration curves, astigmatic field curves and a distortion curve of the optical photographing lens system according to the 5th embodiment.

FIG. 9 is a schematic view of an optical photographing lens system according to the 5th embodiment of the present disclosure. FIG. 10 shows spherical aberration curves, astigmatic field curves and a distortion curve of the optical photographing lens system according to the 5th embodiment. In FIG. 9, the optical photographing lens system includes, in order from an object side to an image side, an aperture stop 500, a first lens element 510, a second lens element 520, a third lens element 530, a fourth lens element 540, a fifth lens element 550, a sixth lens element 560, an IR-cut filter 580 and an image plane 570.

The first lens element 510 with positive refractive power has a convex object-side surface 511 and a concave image-side surface 512. The first lens element 510 is made of plastic material and has the object-side surface 511 and the image-side surface 512 being aspheric.

The second lens element 520 with positive refractive power has a convex object-side surface 521 and a convex image-side surface 522. The second lens element 520 is made of plastic material and has the object-side surface 521 and the image-side surface 522 being aspheric.

The third lens element 530 with negative refractive power has a concave object-side surface 531 and a concave image-side surface 532. The third lens element 530 is made of plastic material and has the object-side surface 531 and the image-side surface 532 being aspheric.

The fourth lens element 540 with positive refractive power has a convex object-side surface 541 and a concave image-side surface 542, wherein the object-side surface 541 changes from convex at a paraxial region thereof to concave at a peripheral region thereof, and the image-side surface 542 changed from concave at a paraxial region thereof to convex at a peripheral region thereof. The fourth lens element 540 is made of plastic material and has the object-side surface 541 and the image-side surface 542 being aspheric.

The fifth lens element 550 with positive refractive power has a concave object-side surface 551 and a convex image-side surface 552. The fifth lens element 550 is made of plastic material and has the object-side surface 551 and the image-side surface 552 being aspheric.

The sixth lens element 560 with negative refractive power has a convex object-side surface 561 and a concave image-side surface 562, wherein the image-side surface 562 changes from concave at a paraxial region thereof to convex at a peripheral region thereof. The sixth lens element 560 is made of plastic material and has the object-side surface 561 and the image-side surface 562 being aspheric.

The IR-cut filter 580 is made of plastic material which located between the sixth lens element 560 and the image plane 570, and will not affect the focal length of the optical photographing lens system.

The detailed optical data of the 5th embodiment are shown in Table 9 and the aspheric surface data are shown in Table 10 below.

TABLE 9

5th Embodiment
f = 4.19 mm, Fno = 2.10, HFOV = 36.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.198 | | | | |
| 2 | Lens 1 | 1.975 | (ASP) | 0.514 | Plastic | 1.544 | 55.9 | 6.74 |
| 3 | | 3.885 | (ASP) | 0.105 | | | | |
| 4 | Lens 2 | 6.675 | (ASP) | 0.443 | Plastic | 1.544 | 55.9 | 4.91 |
| 5 | | −4.351 | (ASP) | 0.040 | | | | |
| 6 | Lens 3 | −96.321 | (ASP) | 0.235 | Plastic | 1.634 | 23.8 | −4.33 |
| 7 | | 2.828 | (ASP) | 0.283 | | | | |
| 8 | Lens 4 | 3.594 | (ASP) | 0.358 | Plastic | 1.607 | 26.6 | 33.98 |
| 9 | | 4.189 | (ASP) | 0.321 | | | | |
| 10 | Lens 5 | −3.258 | (ASP) | 0.845 | Plastic | 1.544 | 55.9 | 2.05 |
| 11 | | −0.908 | (ASP) | 0.035 | | | | |
| 12 | Lens 6 | 17.644 | (ASP) | 0.662 | Plastic | 1.544 | 55.9 | −2.09 |
| 13 | | 1.054 | (ASP) | 0.700 | | | | |
| 14 | IR-cut filter | Plano | | 0.200 | Glass | 1.517 | 64.2 | — |
| 15 | | Plano | | 0.736 | | | | |
| 16 | Image | Plano | | — | | | | |

Note:
Reference wavelength (d-line) is 587.6 nm.

TABLE 10

Aspheric Coefficients

| Surface # | 2 | 3 | 4 | 5 | 6 | 7 |
|---|---|---|---|---|---|---|
| k = | −6.8116E−01 | −2.9596E+01 | −8.9131E+01 | −3.9351E+00 | 3.0000E+00 | 8.9683E−01 |
| A4 = | −7.9176E−03 | −6.2401E−02 | −1.0452E−01 | 8.6084E−03 | 1.8381E−02 | −7.0222E−02 |
| A6 = | −1.2698E−02 | −5.4972E−02 | −3.8267E−02 | −1.7239E−01 | −1.4464E−01 | 7.8981E−02 |
| A8 = | 2.1123E−02 | −8.2899E−03 | 9.1065E−02 | 3.6346E−01 | 1.4077E−01 | −1.7718E−01 |
| A10 = | −6.0167E−02 | 7.5451E−02 | 2.8642E−02 | −3.4443E−01 | −1.0918E−01 | 1.8359E−01 |
| A12 = | 3.8868E−02 | −4.1636E−02 | −3.0072E−02 | 1.7481E−01 | 4.8993E−02 | −9.4853E−02 |
| A14 = | −1.3924E−02 | 1.1808E−03 | −7.5516E−04 | −4.0126E−02 | −6.1398E−03 | 1.8228E−02 |

| Surface # | 8 | 9 | 10 | 11 | 12 | 13 |
|---|---|---|---|---|---|---|
| k = | −2.3477E+01 | −3.0000E+01 | −1.3051E+01 | −3.8419E+00 | −1.0000E+00 | −6.4072E+00 |
| A4 = | −1.0302E−01 | −7.2677E−02 | −1.0626E−02 | −6.9480E−02 | 3.4288E−03 | −5.9157E−02 |
| A6 = | 2.1443E−02 | −4.3234E−02 | −4.8302E−02 | 6.8828E−03 | −1.5139E−01 | 1.5602E−02 |
| A8 = | −4.1250E−03 | 4.7916E−02 | −1.5008E−02 | −2.7160E−02 | 1.4424E−01 | −2.5967E−03 |
| A10 = | −2.9575E−02 | −3.6734E−02 | 5.1767E−02 | 4.0938E−02 | −6.7123E−02 | 1.1660E−04 |
| A12 = | 2.3872E−02 | 1.3705E−02 | −2.3120E−02 | −1.7837E−02 | 1.6361E−02 | 1.9128E−05 |
| A14 = | −1.1166E−02 | −9.5977E−04 | 4.4772E−03 | 3.2063E−03 | −1.9082E−03 | −2.4181E−06 |
| A16 = | | 6.5294E−05 | −6.7817E−04 | −2.1906E−04 | 7.8119E−05 | 8.8414E−08 |

In the optical photographing lens system according to the 5th embodiment, the definitions of f, Fno HFOV, V1, V3, CT2, CT3, CT4, T12, T23, T34, T45, ET23, R3, R4, R7, f1, f2 and f4 are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 4.19 | T23/ET23 | 0.40 |
| Fno | 2.00 | (R3 + R4)/R3 − R4) | 0.21 |
| HFOV (deg.) | 36.5 | f/R7 | 1.17 |
| V3/V1 | 0.43 | f2/f1 | 0.73 |
| CT3/CT2 | 0.53 | f/f4 | 0.12 |
| CT3 + CT4 (mm) | 0.593 | (f/f1)/((f/f2) + (f/f4)) | 0.64 |
| (T12 + T23)/(T34 + T45) | 0.24 | | |

6th Embodiment

Figure 11:
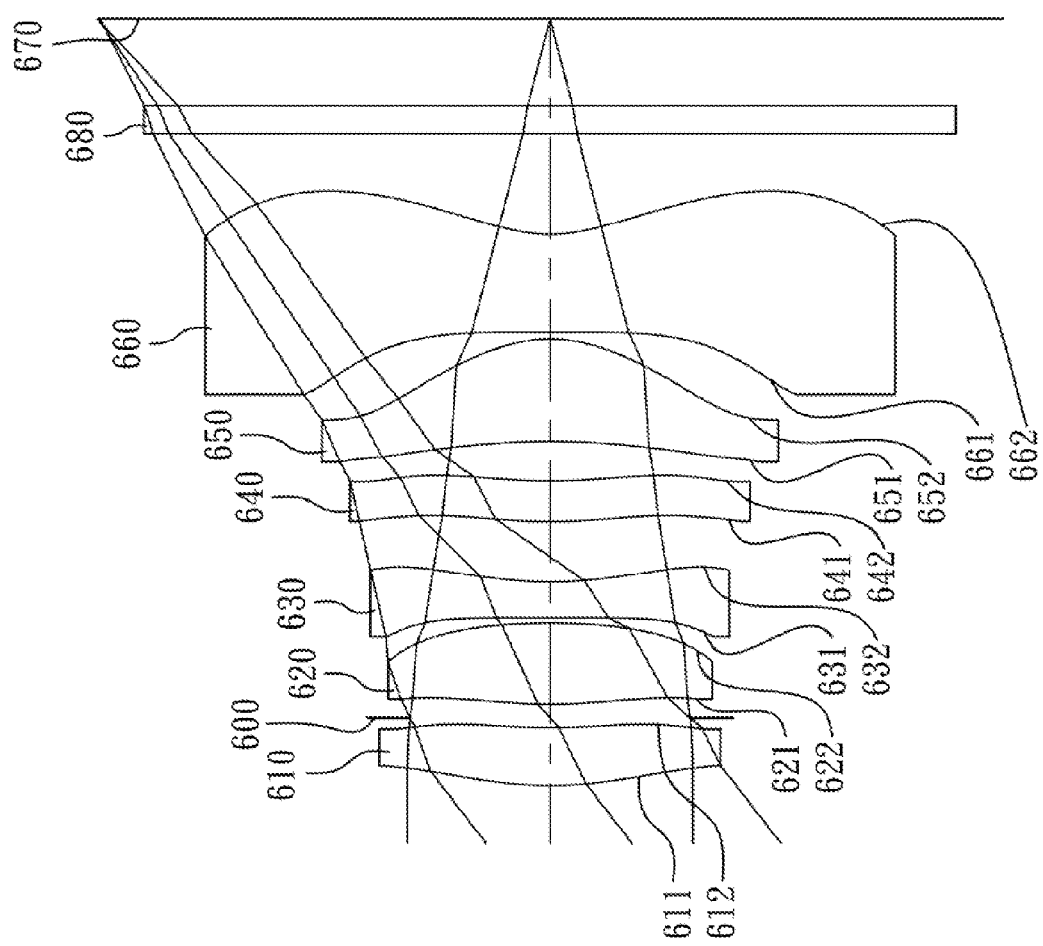
FIG. 11 is a schematic view of an optical photographing lens system according to the 6th embodiment of the present disclosure.
Figure 12:
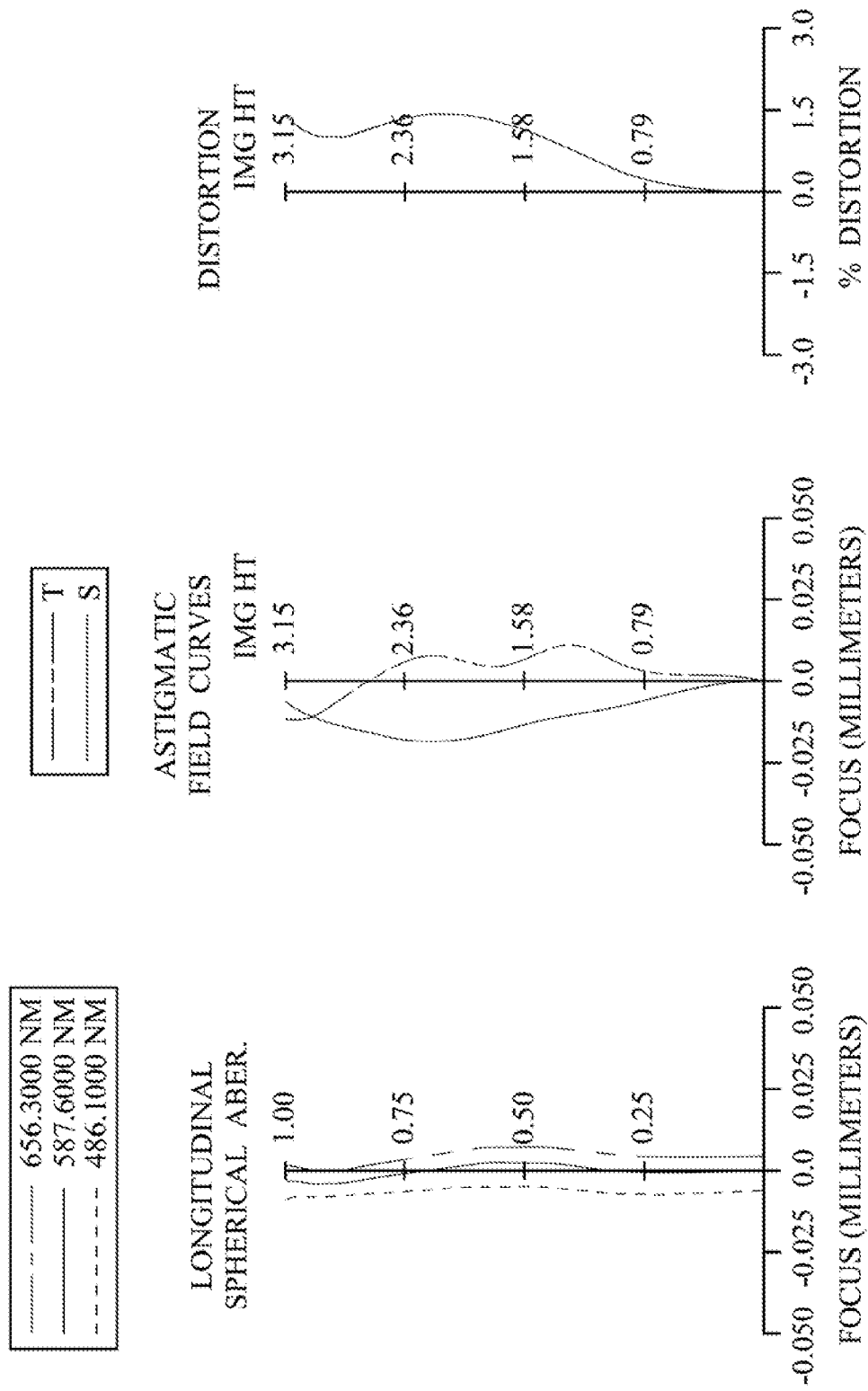
FIG. 12 shows spherical aberration curves, astigmatic field curves and a distortion curve of the optical photographing lens system according to the 6th embodiment.

FIG. 11 is a schematic view of an optical photographing lens system according to the 6th embodiment of the present disclosure. FIG. 12 shows spherical aberration curves, astigmatic field curves and a distortion curve of the optical photographing lens system according to the 6th embodiment. In FIG. 11, the optical photographing lens system includes, in order from an object side to an image side, a first lens element 610, an aperture stop 600, a second lens element 620, a third lens element 630, a fourth lens element 640, a fifth lens element 650, a sixth lens element 660, an IR-cut filter 680 and an image plane 670.

The first lens element 610 with positive refractive power has a convex object-side surface 611 and a concave image-side surface 612. The first lens element 610 is made of plastic material and has the object-side surface 611 and the image-side surface 612 being aspheric.

The second lens element 620 with positive refractive power has a convex object-side surface 621 and a convex image-side surface 622. The second lens element 620 is made of plastic material and has the object-side surface 621 and the image-side surface 622 being aspheric.

The third lens element 630 with negative refractive power has a convex object-side surface 631 and a concave image-side surface 632. The third lens element 630 is made of plastic material and has the object-side surface 631 and the image-side surface 632 being aspheric.

The fourth lens element 640 with positive refractive power has a convex object-side surface 641 and a concave image-side surface 642, wherein the object-side surface 641 changes from convex at a paraxial region thereof to concave at a peripheral region thereof, and the image-side surface 642 changed from concave at a paraxial region thereof to convex at a peripheral region thereof. The fourth lens element 640 is made of plastic material and has the object-side surface 641 and the image-side surface 642 being aspheric.

The fifth lens element 650 with positive refractive power has a concave object-side surface 651 and a convex image-side surface 652. The fifth lens element 650 is made of plastic material and has the object-side surface 651 and the image-side surface 652 being aspheric.

The sixth lens element 660 with negative refractive power has a concave object-side surface 661 and a concave image-side surface 662, wherein the image-side surface 662 changes from concave at a paraxial region thereof to convex at a peripheral region thereof. The sixth lens element 660 is made of plastic material and has the object-side surface 661 and the image-side surface 662 being aspheric.

The IR-cut filter 680 is made of plastic material which located between the sixth lens element 660 and the image plane 670, and will not affect the focal length of the optical photographing lens system.

The detailed optical data of the 6th embodiment are shown in Table 11 and the aspheric surface data are shown in Table 12 below.

TABLE 11

6th Embodiment
f = 3.98 mm, Fno = 2.00, HFOV = 38.0 deg.

| Surface # | | Curvature Radius | | Thickness | Material | Index | Abbe # | Focal length |
|---|---|---|---|---|---|---|---|---|
| 0 | Object | Plano | | infinity | | | | |
| 1 | Lens 1 | 2.740 | (ASP) | 0.407 | Plastic | 1.544 | 55.9 | 13.79 |
| 2 | | 4.091 | (ASP) | 0.069 | | | | |
| 3 | Ape. Stop | Plano | | 0.095 | | | | |
| 4 | Lens 2 | 3.475 | (ASP) | 0.567 | Plastic | 1.544 | 55.9 | 3.50 |
| 5 | | −3.968 | (ASP) | 0.034 | | | | |
| 6 | Lens 3 | 121.547 | (ASP) | 0.250 | Plastic | 1.634 | 23.8 | −4.40 |
| 7 | | 2.728 | (ASP) | 0.422 | | | | |
| 8 | Lens 4 | 3.521 | (ASP) | 0.280 | Plastic | 1.634 | 23.8 | 49.42 |
| 9 | | 3.844 | (ASP) | 0.279 | | | | |
| 10 | Lens 5 | −4.692 | (ASP) | 0.713 | Plastic | 1.544 | 55.9 | 1.96 |
| 11 | | −0.916 | (ASP) | 0.050 | | | | |
| 12 | Lens 6 | −100.000 | (ASP) | 0.679 | Plastic | 1.544 | 55.9 | −1.85 |
| 13 | | 1.021 | (ASP) | 0.700 | | | | |
| 14 | IR-cut filter | Plano | | 0.200 | Glass | 1.517 | 64.2 | — |
| 15 | | Plano | | 0.606 | | | | |
| 16 | Image | Plano | | — | | | | |

Note:
Reference wavelength (d-line) is 587.6 nm.

TABLE 12

Aspheric Coefficients

| Surface # | 1 | 2 | 4 | 5 | 6 | 7 |
|---|---|---|---|---|---|---|
| k = | −6.2098E+00 | −6.9313E+00 | −4.5659E+00 | −2.8348E+01 | −3.0000E+01 | −9.4122E+00 |
| A4 = | −1.8519E−02 | −1.5441E−01 | −1.1973E−01 | −1.0829E−02 | −2.5309E−02 | −7.5662E−02 |
| A6 = | −2.0230E−02 | 5.8544E−03 | −5.0307E−02 | −2.3831E−01 | −8.8284E−02 | 1.3820E−01 |
| A8 = | 1.0184E−02 | 4.7464E−02 | 1.2162E−01 | 3.9308E−01 | 1.1346E−01 | −2.2694E−01 |
| A10 = | −2.4708E−02 | −5.4939E−03 | −3.1670E−02 | −3.6054E−01 | −1.1656E−01 | 1.8063E−01 |
| A12 = | 2.0378E−02 | −1.7126E−02 | −1.7285E−02 | 1.6303E−01 | 4.2188E−02 | −7.5874E−02 |
| A14 = | −4.0529E−03 | 9.3836E−03 | 7.9347E−04 | −3.1232E−02 | 7.2134E−04 | 1.3138E−02 |

| Surface # | 8 | 9 | 10 | 11 | 12 | 13 |
|---|---|---|---|---|---|---|
| k = | −2.2393E+00 | 1.0835E+00 | −2.3110E+01 | −3.8920E+00 | −1.0000E+00 | −6.3380E+00 |
| A4 = | −1.3763E−01 | −1.2107E−01 | 1.5502E−02 | −5.3700E−02 | −1.6554E−02 | −6.2247E−02 |
| A6 = | 3.3360E−02 | 2.9806E−03 | −1.7700E−02 | 2.4501E−02 | −1.3071E−01 | 1.9006E−02 |
| A8 = | 1.5188E−02 | 2.5552E−02 | −2.0206E−02 | −2.7409E−02 | 1.3288E−01 | −4.1922E−03 |
| A10 = | −3.1864E−02 | −2.8488E−02 | 4.4220E−02 | 3.9834E−02 | −6.7007E−02 | 3.9258E−04 |
| A12 = | 2.5824E−02 | 1.8235E−02 | −2.4889E−02 | −1.8040E−02 | 1.7186E−02 | 1.6708E−05 |
| A14 = | −7.0537E−03 | −3.9071E−03 | 5.7094E−03 | 3.1522E−03 | −1.7247E−03 | −6.8188E−06 |
| A16 = | | 6.5294E−05 | −5.0522E−04 | −1.8606E−04 | 1.5615E−06 | 4.2075E−07 |

In the optical photographing lens system according to the 6th embodiment, the definitions of f, Fno, HFOV, V1, V3, CT2, CT3, CT4, T12, T23, T34, T45, ET23, R3, R4 R7, f1, f2 and f4 are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 3.98 | T23/ET23 | 0.20 |
| Fno | 2.00 | (R3 + R4)/R3 − R4) | −0.07 |
| HFOV (deg.) | 38.0 | f/R7 | 1.13 |
| V3/V1 | 0.43 | f2/f1 | 0.25 |
| CT3/CT2 | 0.44 | f/f4 | 0.08 |
| CT3 + CT4 (mm) | 0.530 | (f/f1)/((f/f2) + (f/f4)) | 0.24 |
| (T12 + T23)/(T34 + T45) | 0.28 | | |

7th Embodiment

Figure 13:
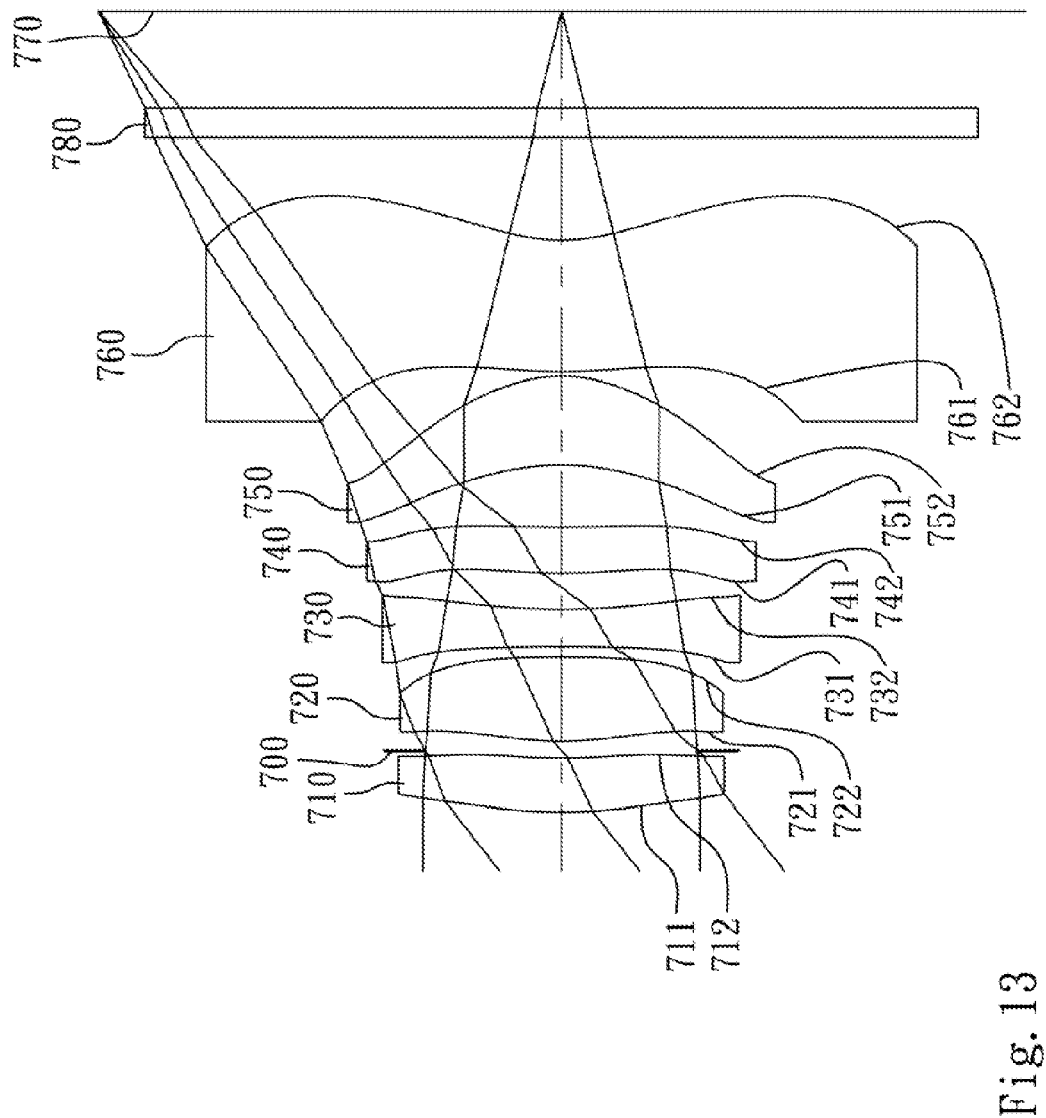
FIG. 13 is a schematic view of an optical photographing lens system according to the 7th embodiment of the present disclosure.
Figure 14:
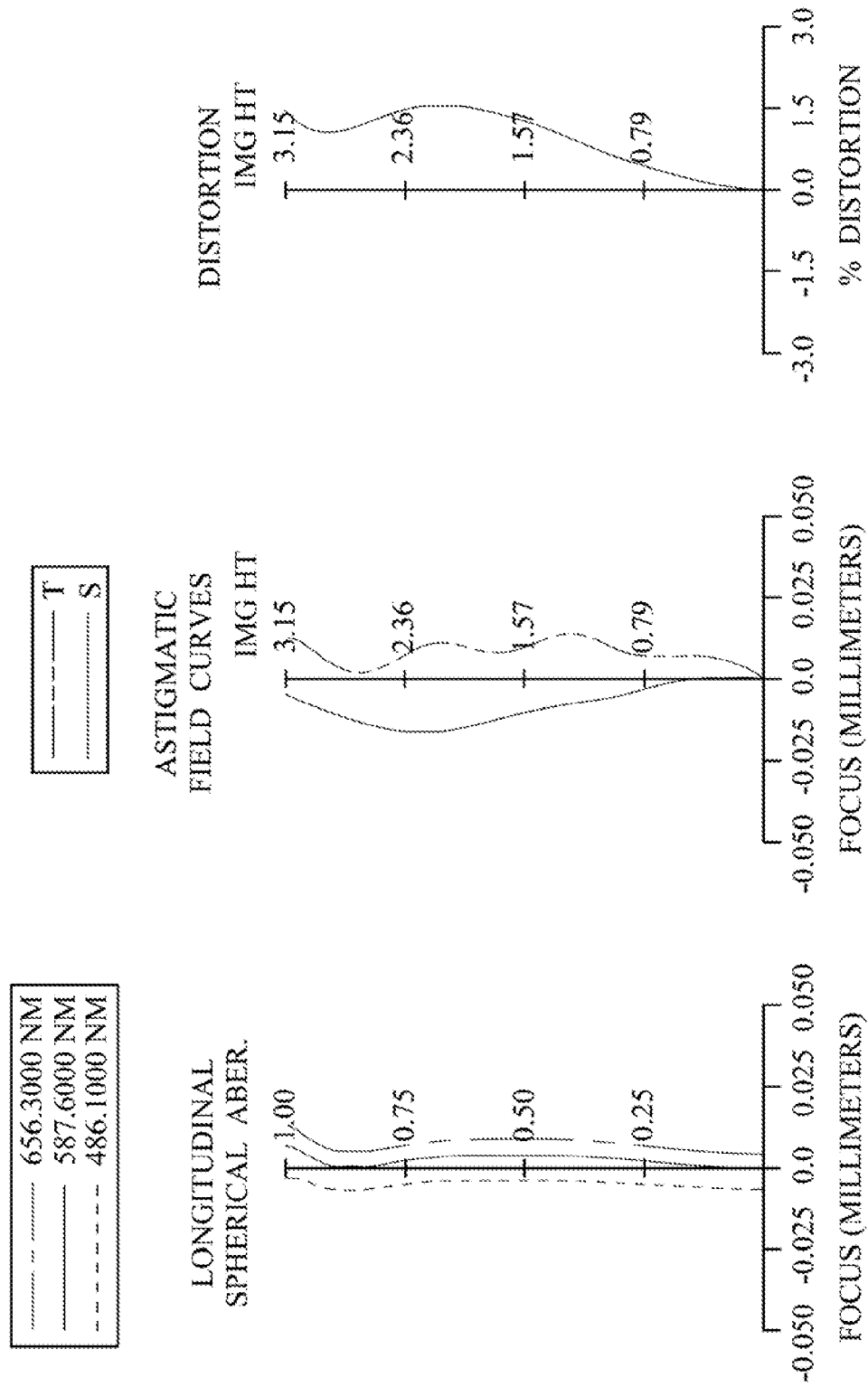
FIG. 14 shows spherical aberration curves, astigmatic field curves and a distortion curve of the optical photographing lens system according to the 7th embodiment.

FIG. 13 is a schematic view of an optical photographing lens system according to the 7th embodiment of the present disclosure. FIG. 14 shows spherical aberration curves, astigmatic field curves and a distortion curve of the optical photographing lens system according to the 7th embodiment. In FIG. 13, the optical photographing lens system includes, in order from an object side to an image side, a first lens element 710, an aperture stop 700, a second lens element 720, a third lens element 730, a fourth lens element 740, a fifth lens element 750, a sixth lens element 760, an IR-cut filter 780 and an image plane 770.

The first lens element 710 with positive refractive power has a convex object-side surface 711 and a concave image-side surface 712. The first lens element 710 is made of plastic material and has the object-side surface 711 and the image-side surface 712 being aspheric.

The second lens element 720 with positive refractive power has a convex object-side surface 721 and a convex image-side surface 722. The second lens element 720 is made of plastic material and has the object-side surface 721 and the image-side surface 722 being aspheric.

The third lens element 730 with negative refractive power has a concave object-side surface 731 and a concave image-side surface 732. The third lens element 730 is made of plastic material and has the object-side surface 731 and the image-side surface 732 being aspheric.

The fourth lens element 740 with positive refractive power has a convex object-side surface 741 and a concave image-side surface 742, wherein the object-side surface 741 changes from convex at a paraxial region thereof to concave at a peripheral region thereof, and the image-side surface 742 changed from concave at a paraxial region thereof to convex at a peripheral region thereof. The fourth lens element 740 is made of plastic material and has the object-side surface 741 and the image-side surface 742 being aspheric.

The fifth lens element 750 with positive refractive power has a concave object-side surface 751 and a convex image-side surface 752. The fifth lens element 750 is made of plastic material and has the object-side surface 751 and the image-side surface 752 being aspheric.

The sixth lens element 760 with negative refractive power has a convex object-side surface 761 and a concave image-side surface 762, wherein the image-side surface 762 changes from concave at a paraxial region thereof to convex at a peripheral region thereof. The sixth lens element 760 is made of plastic material and has the object-side surface 761 and the image-side surface 762 being aspheric.

The IR-cut filter 780 is made of plastic material which located between the sixth lens element 760 and the image plane 770, and will not affect the focal length of the optical photographing lens system.

The detailed optical data of the 7th embodiment are shown in Table 13 and the aspheric surface data are shown in Table 14 below.

TABLE 13

7th Embodiment
f = 3.95 mm, Fno = 2.10, HFOV = 38.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 3.238 | (ASP) | 0.370 | Plastic | 1.544 | 55.9 | 46.69 |
| 2 | | 3.562 | (ASP) | 0.049 | | | | |
| 3 | Ape. Stop | Plano | | 0.067 | | | | |
| 4 | Lens 2 | 2.350 | (ASP) | 0.572 | Plastic | 1.544 | 55.9 | 3.46 |
| 5 | | −8.608 | (ASP) | 0.070 | | | | |
| 6 | Lens 3 | −14.356 | (ASP) | 0.250 | Plastic | 1.640 | 23.3 | −5.12 |
| 7 | | 4.276 | (ASP) | 0.251 | | | | |
| 8 | Lens 4 | 3.994 | (ASP) | 0.314 | Plastic | 1.544 | 55.9 | 10.78 |
| 9 | | 12.162 | (ASP) | 0.419 | | | | |
| 10 | Lens 5 | −1.642 | (ASP) | 0.605 | Plastic | 1.544 | 55.9 | 3.72 |
| 11 | | −1.024 | (ASP) | 0.030 | | | | |
| 12 | Lens 6 | 4.037 | (ASP) | 0.895 | Plastic | 1.544 | 55.9 | −3.58 |
| 13 | | 1.212 | (ASP) | 0.700 | | | | |
| 14 | IR-cut filter | Plano | | 0.200 | Glass | 1.517 | 64.2 | — |
| 15 | | Plano | | 0.660 | | | | |
| 16 | Image | Plano | | — | | | | |

Note:
Reference wavelength (d-line) is 587.6 nm.

TABLE 14

Aspheric Coefficients

| Surface # | 1 | 2 | 4 | 5 | 6 | 7 |
|---|---|---|---|---|---|---|
| k = | −1.7054E+01 | −1.8294E+01 | −7.9066E+00 | −5.9188E+00 | −2.0250E+01 | −4.5433E−02 |
| A4 = | −2.2088E−03 | −1.9983E−01 | −1.3805E−01 | −2.8009E−02 | 9.7257E−03 | −7.3842E−02 |
| A6 = | −2.3817E−02 | 8.6135E−02 | −2.9260E−02 | −2.6379E−01 | −9.2986E−02 | 1.5072E−01 |
| A8 = | 1.0219E−02 | 4.6894E−02 | 1.2893E−01 | 4.0210E−01 | 1.2734E−01 | −2.2907E−01 |
| A10 = | −1.3798E−02 | −6.6806E−02 | −7.1088E−02 | −3.4785E−01 | −1.2840E−01 | 1.7637E−01 |
| A12 = | 1.7587E−02 | 3.6969E−02 | 6.6247E−03 | 1.5665E−01 | 5.1676E−02 | −8.2065E−02 |
| A14 = | −4.0642E−03 | −2.3032E−03 | −4.1008E−03 | −3.2267E−02 | −2.6464E−03 | 1.9308E−02 |

| Surface # | 8 | 9 | 10 | 11 | 12 | 13 |
|---|---|---|---|---|---|---|
| k = | −4.5700E+00 | −2.3344E+01 | −6.2336E+00 | −3.2158E+00 | −1.0000E+00 | −5.6887E+00 |
| A4 = | −1.4729E−01 | −4.6316E−02 | −5.0481E−03 | −9.7741E−02 | −1.0360E−01 | −5.7045E−02 |
| A6 = | 2.4249E−02 | −5.1526E−02 | −3.0400E−02 | 3.4843E−02 | −4.8820E−02 | 1.5594E−02 |
| A8 = | −3.0233E−02 | 2.9264E−02 | −9.2804E−02 | −3.4944E−02 | 8.1400E−02 | −3.2270E−03 |
| A10 = | −1.6827E−02 | −2.1802E−02 | 4.4876E−02 | 3.7611E−02 | −5.1963E−02 | 2.9972E−04 |
| A12 = | 4.5720E−02 | 2.0292E−02 | −2.6661E−02 | −1.6620E−02 | 1.7976E−02 | 2.0989E−06 |
| A14 = | −1.3337E−02 | −5.0774E−03 | 6.0873E−03 | 3.9778E−03 | −3.4245E−03 | −3.0472E−06 |
| A16 = | | 6.5294E−05 | −4.5345E−04 | −4.0517E−04 | 2.7816E−04 | 1.8496E−07 |

In the optical photographing lens system according to the 7th embodiment, the definitions of f, Fno, HFOV, V1, V3, CT2, CT3, CT4, T12, T23, T34, T45, ET23, R3, R4, R7, f1, f2 and f4 are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 3.95 | T23/ET23 | 0.33 |
| Fno | 2.10 | (R3 + R4)/R3 − R4) | −0.57 |
| HFOV (deg.) | 38.1 | f/R7 | 0.99 |
| V3/V1 | 0.42 | f2/f1 | 0.07 |
| CT3/CT2 | 0.44 | f/f4 | 0.37 |
| CT3 + CT4 (mm) | 0.564 | (f/f1)/((f/f2) + (f/f4)) | 0.06 |
| (T12 + T23)/(T34 + T45) | 0.28 | | |

8th Embodiment

Figure 15:
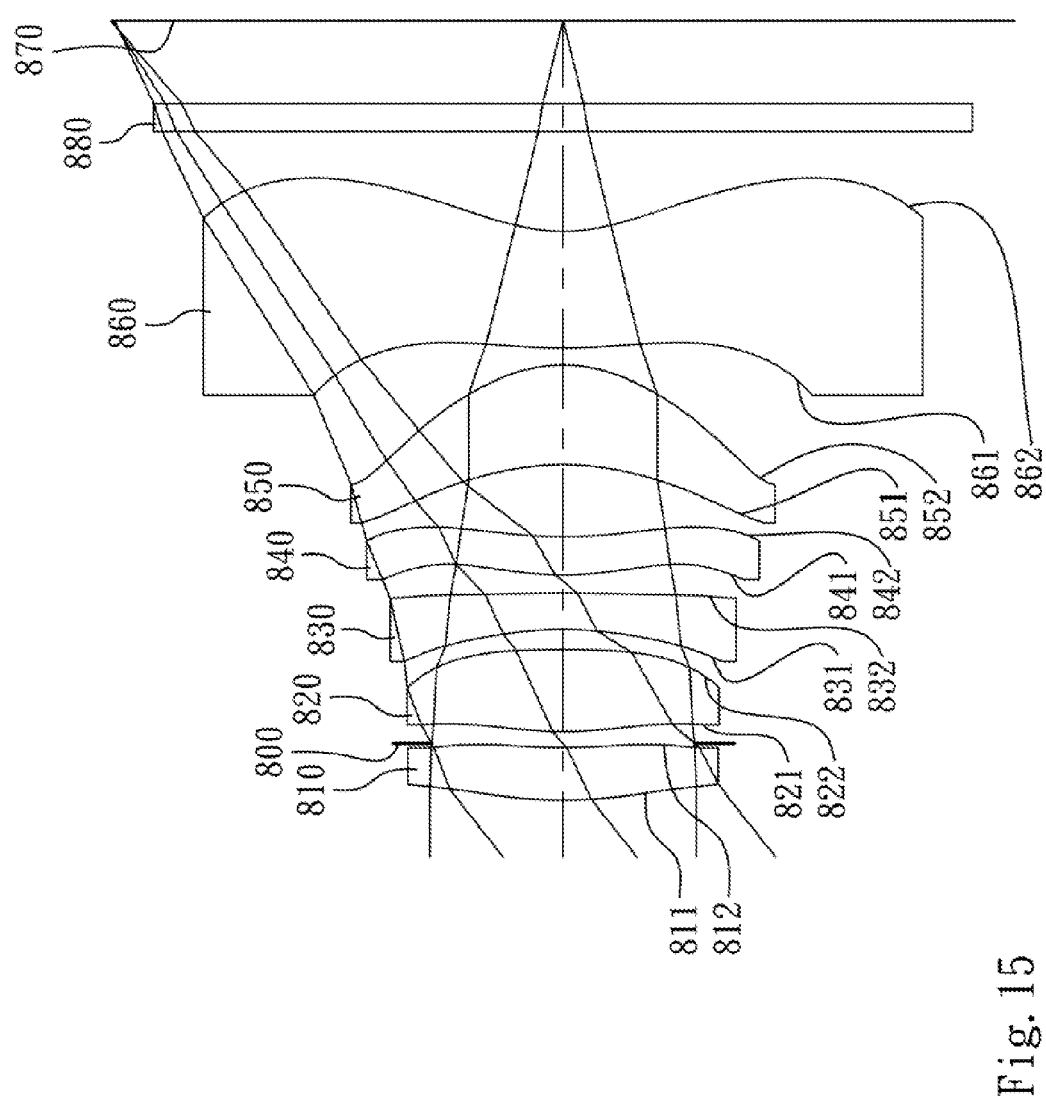
FIG. 15 is a schematic view of an optical photographing lens system according to the 8th embodiment of the present disclosure.
Figure 16:
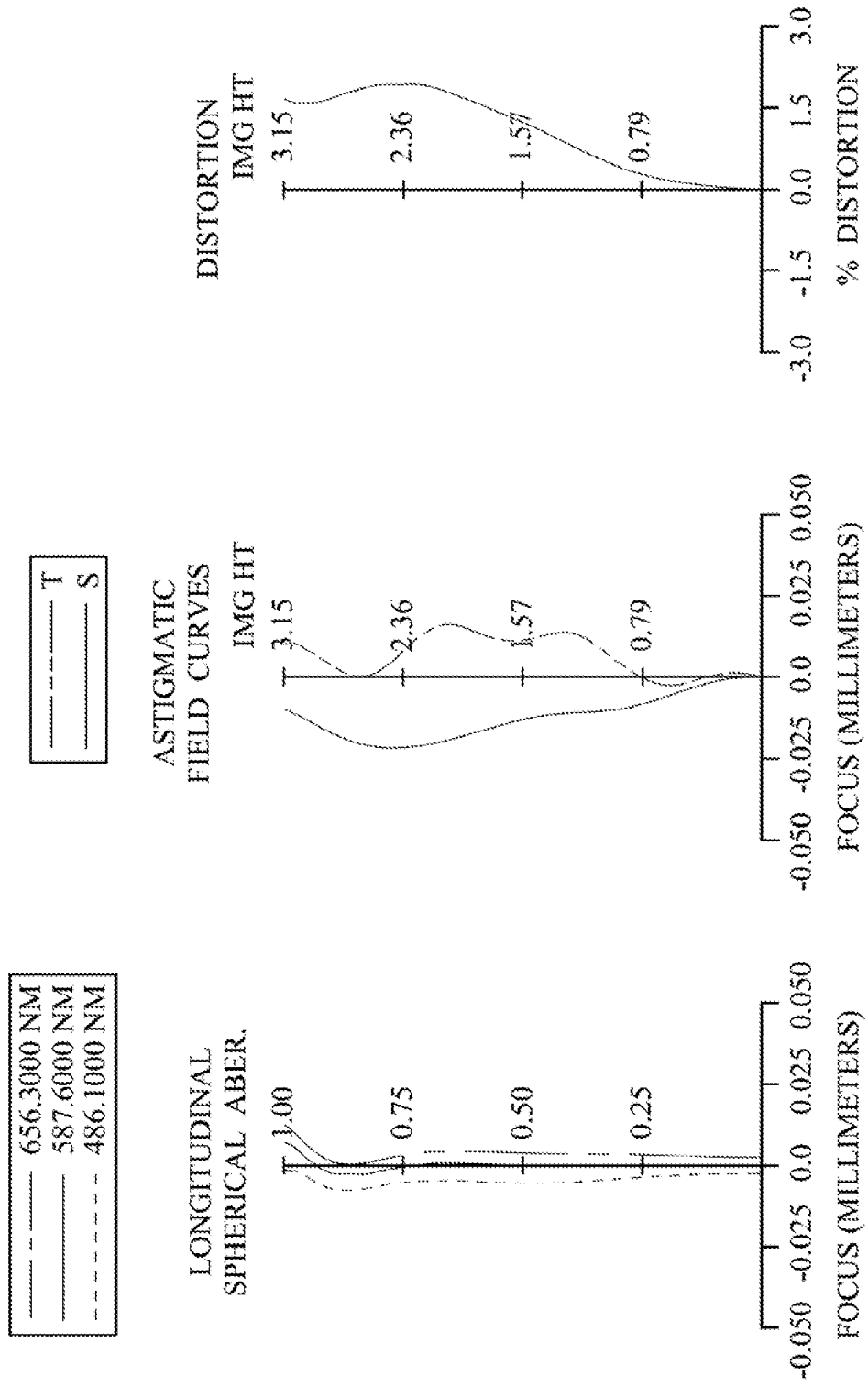
FIG. 16 shows spherical aberration curves, astigmatic field curves and a distortion curve of the optical photographing lens system according to the 8th embodiment.

FIG. 15 is a schematic view of an optical photographing lens system according to the 8th embodiment of the present disclosure. FIG. 16 shows spherical aberration curves, astigmatic field curves and a distortion curve of the optical photographing lens system according to the 8th embodiment. In FIG. 15, the optical photographing lens system includes, in order from an object side to an image side, a first lens element 810, an aperture stop 800, a second lens element 820, a third lens element 830, a fourth lens element 840, a fifth lens element 850, a sixth lens element 860, an IR-cut filter 880 and an image plane 870.

The first lens element 810 with positive refractive power has a convex object-side surface 811 and a concave image-side surface 812. The first lens element 810 is made of plastic material and has the object-side surface 811 and the image-side surface 812 being aspheric.

The second lens element 820 with positive refractive power has a convex object-side surface 821 and a convex image-side surface 822. The second lens element 820 is made of plastic material and has the object-side surface 821 and the image-side surface 822 being aspheric.

The third lens element 830 with negative refractive power has a concave object-side surface 831 and a convex image-side surface 832. The third lens element 830 is made of plastic material and has the object-side surface 831 and the image-side surface 832 being aspheric.

The fourth lens element 840 with positive refractive power has a convex object-side surface 841 and a concave image-side surface 842, wherein the object-side surface 841 changes from convex at a paraxial region thereof to concave at a peripheral region thereof, and the image-side surface 842 changed from concave at a paraxial region thereof to convex at a peripheral region thereof. The fourth lens element 840 is made of plastic material and has the object-side surface 841 and the image-side surface 842 being aspheric.

The fifth lens element 850 with positive refractive power has a concave object-side surface 851 and a convex image-side surface 852. The fifth lens element 850 is made of plastic material and has the object-side surface 851 and the image-side surface 852 being aspheric.

The sixth lens element 860 with negative refractive power has a convex object-side surface 861 and a concave image-side surface 862, wherein the image-side surface 862 changes from concave at a paraxial region thereof to convex at a peripheral region thereof. The sixth lens element 860 is made of plastic material and has the object-side surface 861 and the image-side surface 862 being aspheric.

The IR-cut filter 880 is made of plastic material which located between the sixth lens element 860 and the image plane 870, and will not affect the focal length of the optical photographing lens system.

The detailed optical data of the 8th embodiment are shown in Table 15 and the aspheric surface data are shown in Table 16 below.

TABLE 15

8th Embodiment
f = 3.91 mm, Fno = 2.10, HFOV = 38.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 3.162 | (ASP) | 0.368 | Plastic | 1.535 | 56.3 | 32.80 |
| 2 | | 3.702 | (ASP) | 0.028 | | | | |
| 3 | Ape. Stop | Plano | | 0.084 | | | | |
| 4 | Lens 2 | 2.512 | (ASP) | 0.574 | Plastic | 1.535 | 56.3 | 3.66 |
| 5 | | −8.092 | (ASP) | 0.141 | | | | |
| 6 | Lens 3 | −2.327 | (ASP) | 0.250 | Plastic | 1.640 | 23.3 | −4.58 |
| 7 | | −11.733 | (ASP) | 0.127 | | | | |
| 8 | Lens 4 | 1.969 | (ASP) | 0.272 | Plastic | 1.535 | 56.3 | 8.28 |
| 9 | | 3.377 | (ASP) | 0.501 | | | | |
| 10 | Lens 5 | −1.806 | (ASP) | 0.697 | Plastic | 1.514 | 56.8 | 3.27 |
| 11 | | −0.984 | (ASP) | 0.119 | | | | |
| 12 | Lens 6 | 4.294 | (ASP) | 0.815 | Plastic | 1.535 | 56.3 | −3.11 |
| 13 | | 1.118 | (ASP) | 0.700 | | | | |
| 14 | IR-cut filter | Plano | | 0.200 | Glass | 1.517 | 64.2 | — |
| 15 | | Plano | | 0.577 | | | | |
| 16 | Image | Plano | | — | | | | |

Note:
Reference wavelength (d-line) is 587.6 nm.

TABLE 16

Aspheric Coefficients

| Surface # | 1 | 2 | 4 | 5 | 6 | 7 |
|---|---|---|---|---|---|---|
| k = | −1.6433E+01 | −2.1638E+01 | −1.1139E+01 | 3.0000E+00 | −2.0861E+01 | −3.0000E+01 |
| A4 = | −1.2564E−03 | −2.0448E−01 | −1.4226E−01 | −6.6548E−02 | 2.0128E−04 | 1.7958E−02 |
| A6 = | −2.8934E−02 | 7.8371E−02 | −3.6083E−02 | −2.4143E−01 | −9.0314E−02 | 1.1724E−01 |
| A8 = | 4.9160E−03 | 4.1972E−02 | 1.3199E−01 | 4.0654E−01 | 1.3358E−01 | −2.3933E−01 |
| A10 = | −1.4817E−02 | −6.2142E−02 | −5.5430E−02 | −3.5122E−01 | −1.3493E−01 | 1.8457E−01 |
| A12 = | 1.8332E−02 | 4.0913E−02 | 9.4418E−04 | 1.5243E−01 | 4.7762E−02 | −7.6947E−02 |
| A14 = | −2.6287E−03 | −3.8068E−03 | −6.1617E−03 | −3.0333E−02 | 2.3146E−03 | 1.6113E−02 |

| Surface # | 8 | 9 | 10 | 11 | 12 | 13 |
|---|---|---|---|---|---|---|
| k = | −1.2794E+01 | −2.4886E−02 | −5.2509E+00 | −3.0407E+00 | −1.0000E+00 | −4.9267E+00 |
| A4 = | −8.1229E−02 | −5.3882E−02 | 2.4521E−03 | −9.7991E−02 | −7.2744E−02 | −5.3904E−02 |
| A6 = | 1.3070E−03 | −5.2392E−02 | −2.9928E−02 | 3.3761E−02 | −6.3693E−02 | 1.5266E−02 |
| A8 = | −4.3926E−02 | 3.0304E−02 | −1.1122E−02 | −4.0583E−02 | 8.4935E−02 | −3.0991E−03 |
| A10 = | −1.7818E−02 | −2.3647E−02 | 4.3561E−02 | 3.6269E−02 | −5.1562E−02 | 2.9777E−04 |
| A12 = | 4.6462E−02 | 1.8895E−02 | −2.6949E−02 | −1.6180E−02 | 1.7897E−02 | 7.3983E−07 |
| A14 = | −1.3866E−02 | −5.4103E−03 | 6.2898E−03 | 4.2940E−03 | −3.4332E−03 | −3.0031E−06 |
| A16 = | | 6.5294E−05 | −3.5448E−04 | −3.8793E−04 | 2.7762E−04 | 1.9036E−07 |

In the optical photographing lens system according to the 8th embodiment, the definitions of f, Fno, HFOV, V1, V3, CT2, CT3, CT4, T12, T23, T34, T45, ET23, R3, R4, R7, f1, f2 and f4 are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 3.91 | T23/ET23 | 0.77 |
| Fno | 2.10 | (R3 + R4)/R3 − R4) | −0.53 |
| HFOV (deg.) | 38.4 | f/R7 | 1.99 |
| V3/V1 | 0.41 | f2/f1 | 0.11 |
| CT3/CT2 | 0.44 | f/f4 | 0.47 |
| CT3 + CT4 (mm) | 0.522 | (f/f1)/((f/f2) + (f/f4)) | 0.08 |
| (T12 + T23)/(T34 + T45) | 0.40 | | |

9th Embodiment

Figure 17:
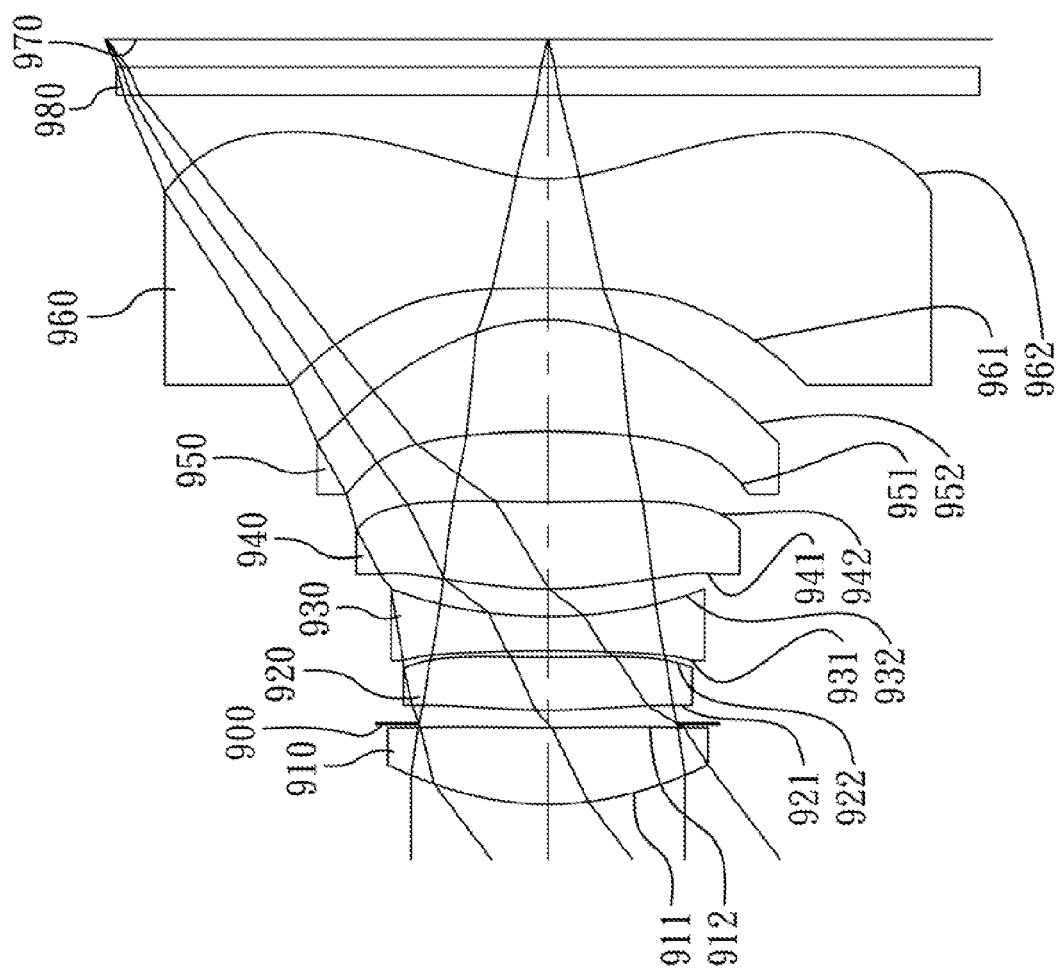
FIG. 17 is a schematic view of an optical photographing lens system according to the 9th embodiment of the present disclosure.
Figure 18:
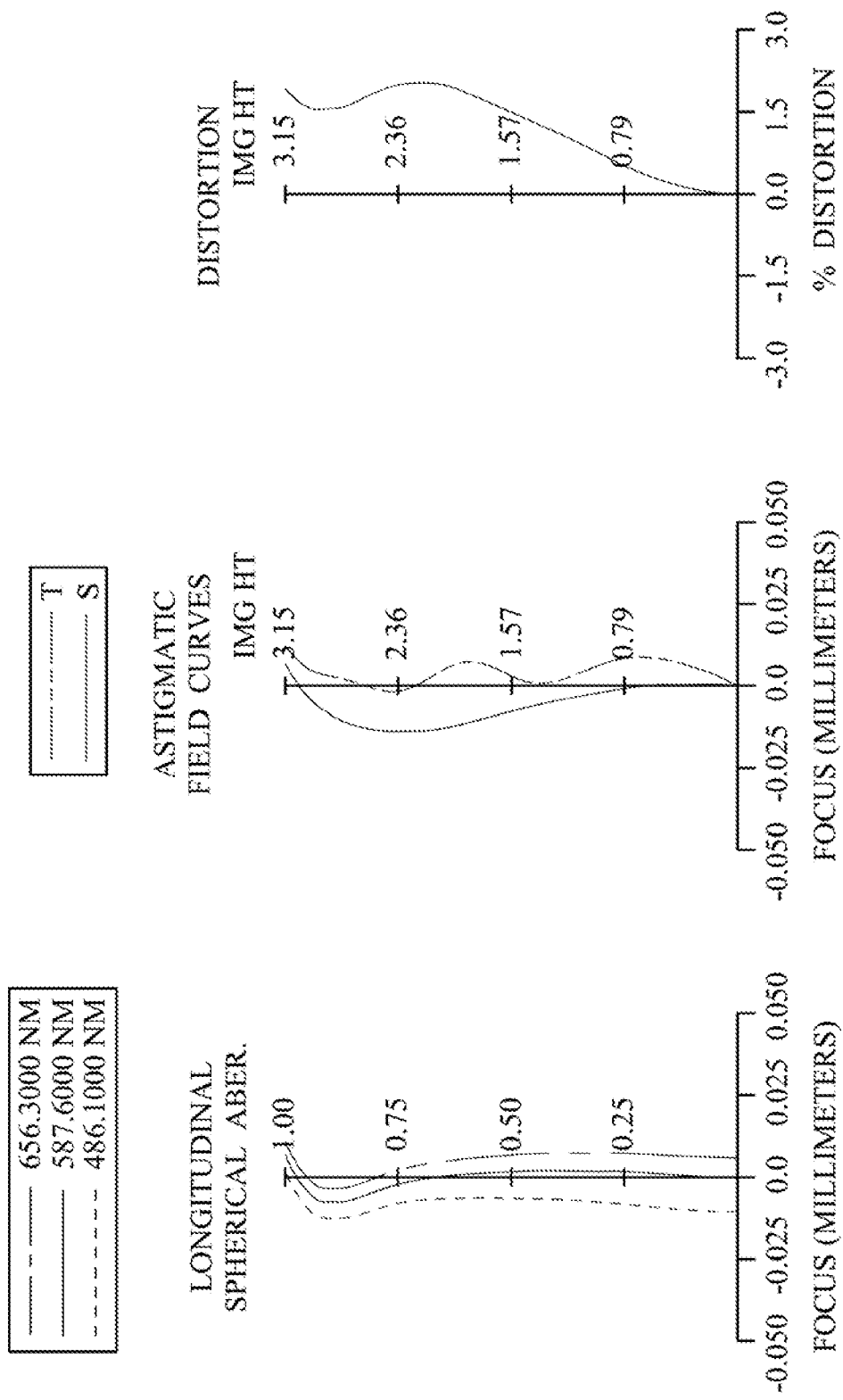
FIG. 18 shows spherical aberration curves, astigmatic field curves and a distortion curve of the optical photographing lens system according to the 9th embodiment.

FIG. 17 is a schematic view of an optical photographing lens system according to the 9th embodiment of the present disclosure. FIG. 18 shows spherical aberration curves, astigmatic field curves and a distortion curve of the optical photographing lens system according to the 9th embodiment. In FIG. 17, the optical photographing lens system includes, in order from an object side to an image side, a first lens element 910, an aperture stop 900, a second lens element 920, a third lens element 930, a fourth lens element 940, a fifth lens element 950, a sixth lens element 960, an IR-cut filter 980 and an image plane 970.

The first lens element 910 with positive refractive power has a convex object-side surface 911 and a concave image-side surface 912. The first lens element 910 is made of plastic material and has the object-side surface 911 and the image-side surface 912 being aspheric.

The second lens element 920 with positive refractive power has a convex object-side surface 921 and a concave image-side surface 922. The second lens element 920 is made of plastic material and has the object-side surface 921 and the image-side surface 922 being aspheric.

The third lens element 930 with negative refractive power has a concave object-side surface 931 and a concave image-side surface 932. The third lens element 930 is made of plastic material and has the object-side surface 931 and the image-side surface 932 being aspheric.

The fourth lens element 940 with positive refractive power has a convex object-side surface 941 and a concave image-side surface 942, wherein the object-side surface 941 changes from convex at a paraxial region thereof to concave at a peripheral region thereof, and the image-side surface 942 changed from concave at a paraxial region thereof to convex at a peripheral region thereof. The fourth lens element 940 is made of plastic material and has the object-side surface 941 and the image-side surface 942 being aspheric.

The fifth lens element 950 with positive refractive power has a concave object-side surface 951 and a convex image-side surface 952. The fifth lens element 950 is made of plastic material and has the object-side surface 951 and the image-side surface 952 being aspheric.

The sixth lens element 960 with negative refractive power has a concave object-side surface 961 and a concave image-side surface 962, wherein the image-side surface 962 changes from concave at a paraxial region thereof to convex at a peripheral region thereof. The sixth lens element 960 is made of plastic material and has the object-side surface 961 and the image-side surface 962 being aspheric.

The IR-cut filter 980 is made of plastic material which located between the sixth lens element 960 and the image plane 970, and will not affect the focal length of the optical photographing lens system.

The detailed optical data of the 9th embodiment are shown in Table 17 and the aspheric surface data are shown in Table 18 below.

TABLE 17

9th Embodiment
f = 4.09 mm, Fno = 2.10, HFOV = 37.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.273 | (ASP) | 0.545 | Plastic | 1.530 | 55.8 | 5.46 |
| 2 | | 9.702 | (ASP) | 0.030 | | | | |
| 3 | Ape. Stop | Plano | | 0.094 | | | | |
| 4 | Lens 2 | 3.987 | (ASP) | 0.374 | Plastic | 1.583 | 30.2 | 9.46 |
| 5 | | 13.889 | (ASP) | 0.046 | | | | |
| 6 | Lens 3 | −9.988 | (ASP) | 0.250 | Plastic | 1.840 | 23.3 | −4.02 |
| 7 | | 3.492 | (ASP) | 0.195 | | | | |
| 8 | Lens 4 | 2.869 | (ASP) | 0.620 | Plastic | 1.535 | 56.3 | 6.24 |
| 9 | | 19.025 | (ASP) | 0.501 | | | | |
| 10 | Lens 5 | −6.086 | (ASP) | 0.797 | Plastic | 1.535 | 56.3 | 2.99 |
| 11 | | −1.325 | (ASP) | 0.222 | | | | |
| 12 | Lens 6 | −12.904 | (ASP) | 0.778 | Plastic | 1.530 | 55.8 | −2.24 |
| 13 | | 1.336 | (ASP) | 0.600 | | | | |
| 14 | IR-cut filter | Plano | | 0.200 | Glass | 1.517 | 64.2 | — |
| 15 | | Plano | | 0.199 | | | | |
| 16 | Image | Plano | | — | | | | |

Note:
Reference wavelength (d-line) is 587.6 nm.

TABLE 18

Aspheric Coefficients

| Surface # | 1 | 2 | 4 | 5 | 6 | 7 |
|---|---|---|---|---|---|---|
| k = | −4.1782E+00 | 1.7675E+00 | −2.3422E+01 | −1.6188E+01 | −1.5015E+01 | −2.2585E+01 |
| A4 = | 3.3904E−02 | −1.1262E−01 | −1.1335E−01 | −5.0010E−02 | 5.8389E−02 | 2.8221E−02 |
| A6 = | −1.1668E−02 | 7.0023E−02 | 3.1795E−03 | −2.1516E−01 | −1.2273E−01 | 1.2163E−01 |
| A8 = | 9.1502E−03 | 1.7583E−02 | 1.2314E−01 | 4.2134E−01 | 1.2614E−01 | −2.2768E−01 |
| A10 = | −1.8047E−02 | −6.0205E−02 | −8.0607E−02 | −3.8305E−01 | −1.1385E−01 | 1.8922E−01 |
| A12 = | 1.4557E−02 | 4.5950E−02 | 7.2224E−03 | 1.5220E−01 | 3.9946E−02 | −8.0097E−02 |
| A14 = | −3.9095E−03 | −1.3670E−02 | −3.6737E−03 | −2.6439E−02 | −4.4657E−04 | 1.4924E−02 |

| Surface # | 8 | 9 | 10 | 11 | 12 | 13 |
|---|---|---|---|---|---|---|
| k = | −1.5515E+01 | −3.0000E+01 | 8.6895E−01 | −5.0582E+00 | −1.0000E+00 | −5.4856E+00 |
| A4 = | −3.9915E−02 | −3.1614E−02 | 5.3925E−03 | −8.7270E−02 | −7.0089E−02 | −5.4304E−02 |
| A6 = | 3.8063E−02 | −1.9708E−02 | −3.1131E−02 | 4.3861E−02 | −5.9933E−02 | 1.6686E−02 |
| A8 = | −1.6195E−02 | 2.3974E−02 | −2.1434E−02 | −4.3075E−02 | 8.7137E−02 | −3.2404E−03 |
| A10 = | −2.5756E−02 | −3.0895E−02 | 4.0065E−02 | 3.4391E−02 | −5.2155E−02 | 2.7499E−04 |
| A12 = | 3.1779E−02 | 1.7229E−02 | −2.7311E−02 | −1.6647E−02 | 1.7866E−02 | 4.8029E−06 |
| A14 = | −1.2269E−02 | −4.3450E−03 | 6.6047E−03 | 4.2329E−03 | −3.3735E−03 | −2.8989E−06 |
| A16 = | | 6.5294E−05 | −2.4346E−04 | −4.1457E−04 | 2.6728E−04 | 1.6244E−07 |

In the optical photographing lens system according to the 9th embodiment, the definitions of f, Fno, HFOV, V1, V3, CT2, CT3, CT4, T12, T23, T34, T45, ET23, R3, R4, R7, f1, f2 and f4 are the same as those stated in the 1st embodiment with corresponding values for the 9th embodiment. Moreover, these parameters can be calculated from Table 17 and Table 18 as the following values and satisfy the following relationships:

| f (mm) | 4.09 | T23/ET23 | 0.84 |
|---|---|---|---|
| Fno | 2.10 | (R3 + R4)/R3 − R4) | −1.81 |
| HFOV (deg.) | 37.1 | f/R7 | 1.42 |
| V3/V1 | 0.42 | f2/f1 | 1.73 |
| CT3/CT2 | 0.67 | f/f4 | 0.66 |
| CT3 + CT4 (mm) | 0.870 | (f/f1)/((f/f2) + (f/f4)) | 0.69 |
| (T12 + T23)/(T34 + T45) | 0.24 | | |

10th Embodiment

Figure 19:
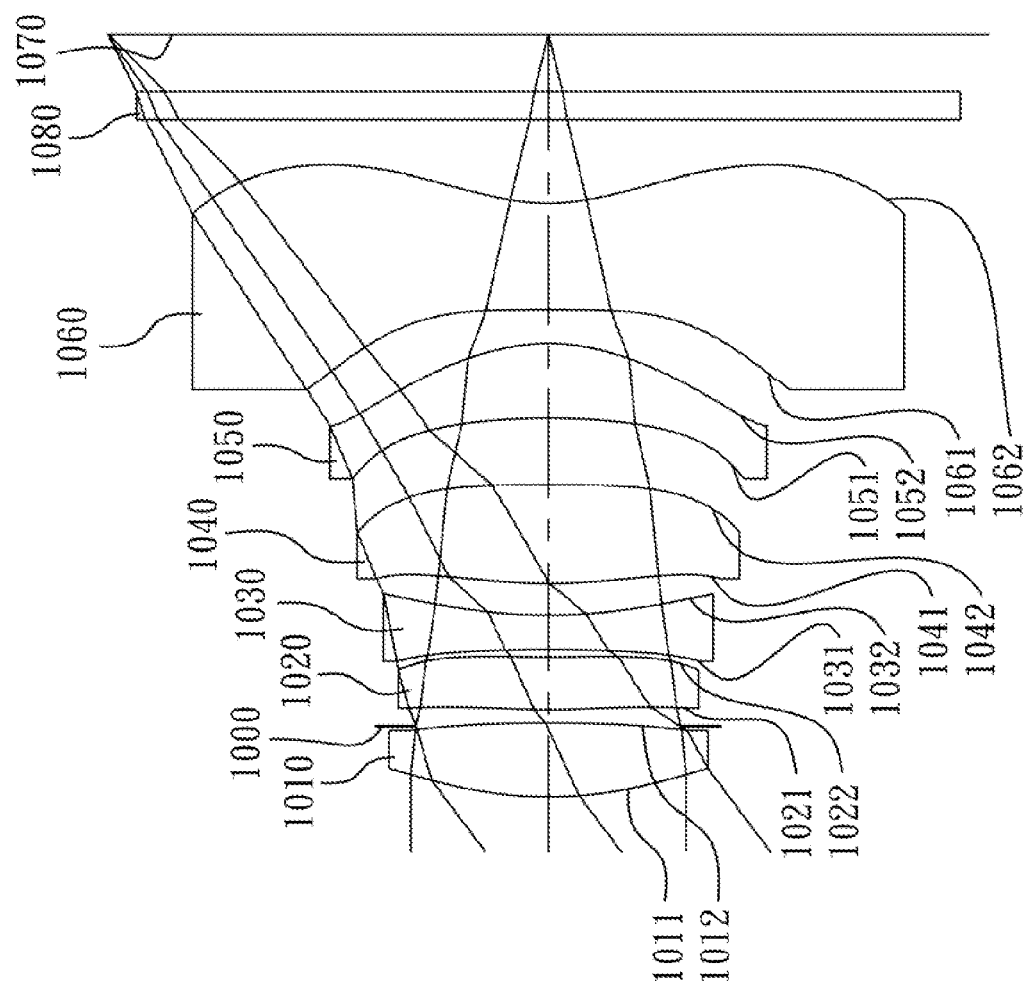
FIG. 19 is a schematic view of an optical photographing lens system according to the 10th embodiment of the present disclosure.
Figure 20:
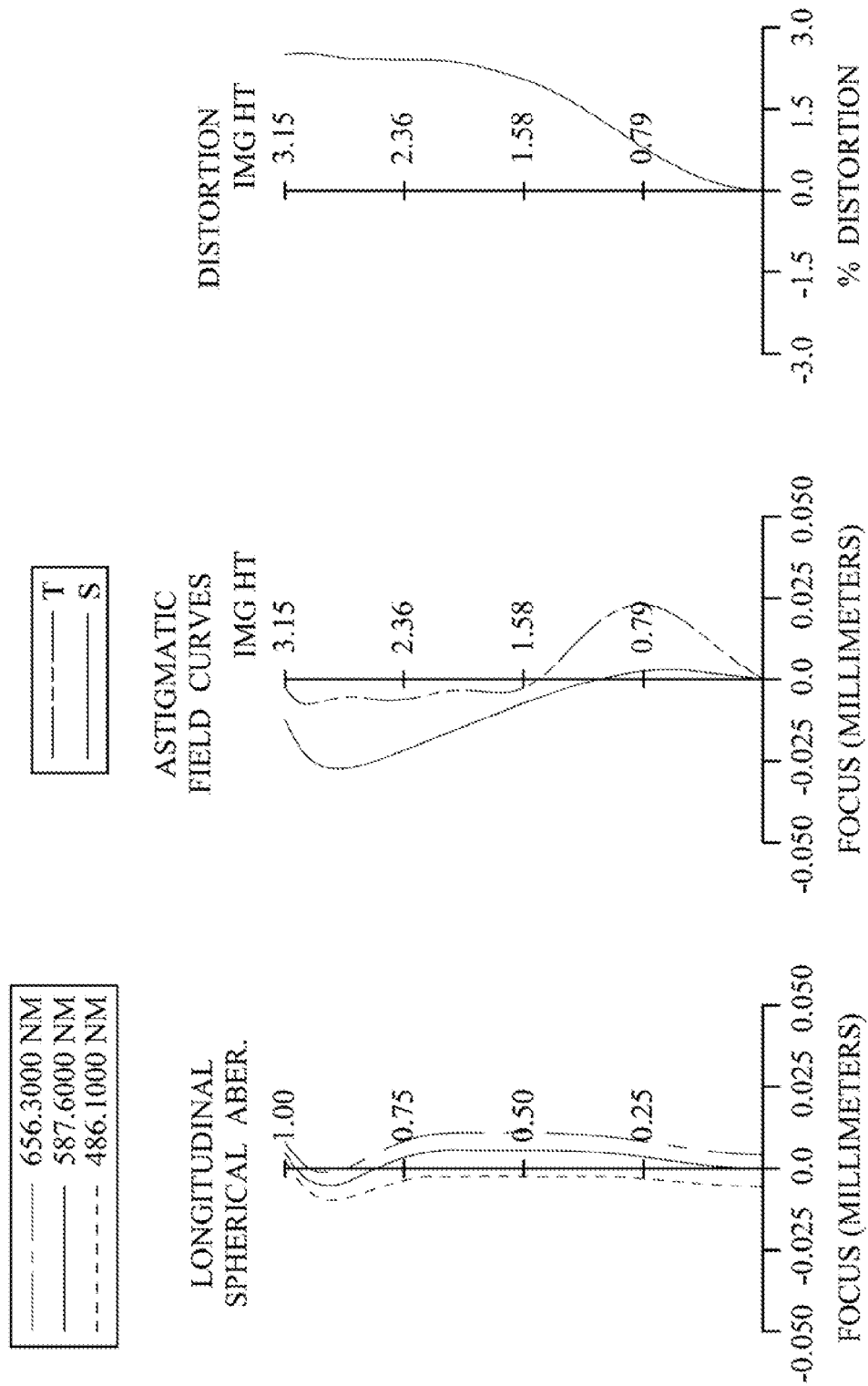
FIG. 20 shows spherical aberration curves, astigmatic field curves and a distortion curve of the optical photographing lens system according to the 10th embodiment.

FIG. 19 is a schematic view of an optical photographing lens system according to the 10th embodiment of the present disclosure. FIG. 20 shows spherical aberration curves, astigmatic field curves and a distortion curve of the optical photographing lens system according to the 10th embodiment. In FIG. 19 the optical photographing lens system includes, in order from an object side to an image side, a first lens element 1010, an aperture stop 1000, a second lens element 1020, a third lens element 1030, a fourth lens element 1040, a fifth lens element 1050, a sixth lens element 1060, an IR-cut filter 1080 and an image plane 1070.

The first lens element 1010 with positive refractive power has a convex object-side surface 1011 and a convex image-side surface 1012. The first lens element 1010 is made of plastic material and has the object-side surface 1011 and the image-side surface 1012 being aspheric.

The second lens element 1020 with positive refractive power has a convex object-side surface 1021 and a concave image-side surface 1022. The second lens element 1020 is made of plastic material and has the object-side surface 1021 and the image-side surface 1022 being aspheric.

The third lens element 1030 with negative refractive power has a concave object-side surface 1031 and a concave image-side surface 1032. The third lens element 1030 is made of plastic material and has the object-side surface 1031 and the image-side surface 1032 being aspheric.

The fourth lens element 1040 with positive refractive power has a convex object-side surface 1041 and a convex image-side surface 1042, wherein the object-side surface 1041 changes from convex at a paraxial region thereof to concave at a peripheral region thereof. The fourth lens element 1040 is made of plastic material and has the object-side surface 1041 and the image-side surface 1042 being aspheric.

The sixth lens element 1060 with negative refractive power has a concave object-side surface 1061 and a concave image-side surface 1062, wherein the image-side surface 1062 changes from concave at a paraxial region thereof to convex at a peripheral region thereof. The sixth lens element 1060 is made of plastic material and has the object-side surface 1061 and the image-side surface 1062 being aspheric.

The IR-cut filter 1080 is made of plastic material which located between the sixth lens element 1060 and the image plane 1070, and will not affect the focal length of the optical photographing lens system.

The detailed optical data of the 10th embodiment are shown in Table 19 and the aspheric surface data are shown in Table 20 below.

TABLE 19

10th Embodiment
f = 4.13 mm, Fno = 2.10, HFOV = 36.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.822 | (ASP) | 0.528 | Plastic | 1.530 | 55.8 | 4.69 |
| 2 | | −19.342 | (ASP) | −0.025 | | | | |
| 3 | Ape. Stop | Plano | | 0.122 | | | | |
| 4 | Lens 2 | 6.203 | (ASP) | 0.371 | Plastic | 1.543 | 56.5 | 18.45 |
| 5 | | 15.931 | (ASP) | 0.054 | | | | |
| 6 | Lens 3 | −8.748 | (ASP) | 0.250 | Plastic | 1.808 | 25.7 | −4.45 |
| 7 | | 3.963 | (ASP) | 0.226 | | | | |
| 8 | Lens 4 | 3.567 | (ASP) | 0.705 | Plastic | 1.535 | 56.3 | 6.05 |
| 9 | | −32.154 | (ASP) | 0.474 | | | | |
| 10 | Lens 5 | −4.959 | (ASP) | 0.538 | Plastic | 1.530 | 55.8 | 3.50 |
| 11 | | −1.402 | (ASP) | 0.242 | | | | |
| 12 | Lens 6 | −33.909 | (ASP) | 0.760 | Plastic | 1.530 | 55.8 | −2.57 |
| 13 | | 1.428 | (ASP) | 0.600 | | | | |
| 14 | IR-cut filter | Plano | | 0.200 | Glass | 1.517 | 64.2 | — |
| 15 | | Plano | | 0.408 | | | | |
| 16 | Image | Plano | | — | | | | |

Note:
Reference wavelength (d-line) is 587.6 nm

TABLE 20

Aspheric Coefficients

| Surface # | 1 | 2 | 4 | 5 | 6 | 7 |
|---|---|---|---|---|---|---|
| k = | −7.2189E+00 | −3.0000E+01 | −5.7987E+01 | 3.0000E+00 | 2.6997E+00 | −2.5121E+01 |
| A4 = | 2.5901E−02 | −7.6681E−02 | −9.9487E−02 | −4.6663E−02 | 5.6931E−02 | 1.5965E−03 |
| A6 = | −1.6864E−02 | 6.3497E−02 | 2.8120E−02 | −2.0544E−01 | −1.2852E−01 | 1.1939E−01 |
| A8 = | 6.7198E−03 | 1.6768E−02 | 1.0866E−01 | 4.0505E−01 | 1.3700E−01 | −2.2339E−01 |
| A10 = | −1.3799E−02 | −6.6412E−02 | −1.1814E−01 | −3.8818E−01 | −1.0860E−01 | 1.8964E−01 |
| A12 = | 1.6441E−02 | 4.7218E−02 | 3.0922E−02 | 1.6553E−01 | 3.4461E−02 | −8.1530E−02 |
| A14 = | −6.5134E−03 | −1.3844E−02 | −3.6738E−03 | −2.5647E−02 | 1.7204E−03 | 1.4015E−02 |

| Surface # | 8 | 9 | 10 | 11 | 12 | 13 |
|---|---|---|---|---|---|---|
| k = | −2.3622E+01 | −3.0000E+01 | −1.3022E+01 | −5.5653E+00 | −1.0000E+00 | −5.7369E+00 |
| A4 = | −5.7546E−02 | −6.2883E−02 | −1.2411E−02 | −7.6354E−02 | −8.3282E−02 | −6.0948E−02 |
| A6 = | 3.3769E−02 | −1.9640E−02 | −2.0298E−02 | 4.7674E−02 | −6.0557E−02 | 1.7255E−02 |
| A8 = | −9.0052E−03 | 2.9077E−02 | −2.7105E−02 | −4.1914E−02 | 8.7045E−02 | −3.3217E−03 |
| A10 = | −2.7846E−02 | −3.4134E−02 | 4.0273E−02 | 3.4564E−02 | −5.2156E−02 | 2.7714E−04 |
| A12 = | 2.5890E−02 | 1.6130E−02 | −2.6305E−02 | −1.6688E−02 | 1.7888E−02 | 7.0952E−06 |
| A14 = | −7.6524E−03 | −3.0744E−03 | 6.7811E−03 | 4.2238E−03 | −3.3586E−03 | −2.7047E−06 |
| A16 = | | 6.5294E−05 | −4.2394E−04 | −3.9908E−04 | 2.7119E−04 | 1.1011E−07 |

The fifth lens element 1050 with positive refractive power has a concave object-side surface 1051 and a convex image-side surface 1052. The fifth lens element 1050 is made of plastic material and has the object-side surface 1051 and the image-side surface 1052 being aspheric.

In the optical photographing lens system according to the 10th embodiment, the definitions of f, Fno, HFOV, V1, V3, CT2, CT3, CT4, T12, T23, T34, T45, ET23, R3, R4, R7, f1, f2 and f4 are the same as those stated in the 1st embodiment with corresponding values for the 10th embodiment. Moreover, these parameters can be calculated from Table 19 and Table 20 as the following values and satisfy the following relationships:

| f (mm) | 4.13 | T23/ET23 | 0.82 |
|---|---|---|---|
| Fno | 2.10 | (R3 + R4)/R3 − R4) | −2.28 |
| HFOV (deg.) | 36.6 | f/R7 | 1.16 |
| V3/V1 | 0.46 | f2/f1 | 3.94 |
| CT3/CT2 | 0.67 | f/f4 | 0.68 |
| CT3 + CT4 (mm) | 0.955 | (f/f1)/((f/f2) + (f/f4)) | 0.97 |
| (T12 + T23)/(T34 + T45) | 0.22 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical photographing lens system comprising, in order from an object side to an image side:
   a first lens element with positive refractive power having a convex object-side surface;
   second lens element with positive refractive power;
   a third lens element with negative refractive power;
   a fourth lens element with refractive power having a convex object-side surface and a concave image-side surface, wherein the object-side surface and the image-side surface of the fourth lens element are aspheric;
   a fifth lens element with positive refractive power having a convex image-side surface, wherein an object-side surface and the image-side surface of the fifth lens element are aspheric; and
   a sixth lens element with negative refractive power having a concave image-side surface, wherein the image-side surface of the sixth lens element changes from concave at a paraxial region thereof to convex at a peripheral region thereof, and an object-side surface and the image-side surface of the sixth lens element are aspheric;
   wherein a focal length of the optical photographing lens system is f, a focal length of the first lens element is f1, a focal length of the second lens element is f2, a focal length of the fourth lens element is f4, and the following relationships are satisfied:

$0 < f2/f1 < 5.0$; and $0 < (f/f1)/((f/f2) + (f/f4)) < 2.0$.

2. The optical photographing lens system of claim 1, wherein the focal length of the optical photographing lens system is f, the focal length of the first lens element is f1 the focal length of the second lens element is f2, the focal length of the fourth lens element is f4, and the following relationship is satisfied:

$0 < (f/f1)/((f/f2) + (f/f4)) < 1.0$.

3. The optical photographing lens system of claim 2, wherein the focal length of the optical photographing lens system is f, the focal length of the fourth lens element is f4, and the following relationship is satisfied:

$-0.2 < f/f4 < 0.5$.

4. The optical photographing lens system of claim 2, wherein an Abbe number of the first lens element is V1, an Abbe number of the third lens element is V3, and the following relationship is satisfied:

$0.3 < V3/V1 < 0.5$.

5. The optical photographing lens system of claim 2, wherein the focal length of the optical photographing lens system is f, a curvature radius of the object-side surface of the fourth lens element is R7, and the following relationship is satisfied:

$0.8 < f/R7 < 2.4$.

6. The optical photographing lens system of claim 2, wherein an axial distance between the second lens element and the third lens element is T23, a distance in parallel with an optical axis between a maximum effective diameter position on an image-side surface of the second lens element and a maximum effective diameter position on an object-side surface of the third lens element is ET23, and the following relationship is satisfied:

$0 < T23/ET23 < 0.45$.

7. The optical photographing lens system of claim 1, wherein the focal length of the first lens element is f1, the focal length of the second lens element is f2, and the following relationship is satisfied:

$0 < f2/f1 < 1.0$.

8. The optical photographing lens system of claim 7, wherein the first lens element has a concave image-side surface, the second lens element has a convex image-side surface, and the third lens element has a concave image-side surface.

9. The optical photographing lens system of claim 7, wherein a central thickness of the third lens element is CT3, a central thickness of the fourth lens element is CT4, and the following relationship is satisfied:

$0.20 \text{ mm} < CT3 + CT4 < 0.65 \text{ mm}$.

10. The optical photographing lens system of claim 7, wherein an f-number of the optical photographing lens system is Fno, and the following relationship is satisfied:

$1.5 < Fno < 2.5$.

11. The optical photographing lens system of claim 1, wherein the object-side surface of the fourth lens element changed from convex at a paraxial region thereof to concave at a peripheral region thereof, and the image-side surface of the fourth lens element changes from concave at a paraxial region thereof to convex at a peripheral region thereof.

12. The optical photographing lens system of claim 11, wherein a curvature radius of an object-side surface of the second lens element is R3, a curvature radius of an image-side surface of the second lens element is R4, and the following relationship is satisfied:

$-0.4 < (R3 + R4)/(R3 - R4) < 0.4$.

13. The optical photographing lens system of claim 11, wherein a central thickness of the second lens element is CT2, a central thickness of the third lens element is CT3, and the following relationship is satisfied:

$0.2 < CT3/CT2 < 0.6$.

14. An optical photographing lens system comprising, in order from an object side to an image side:
- a first lens element with positive refractive power having a convex object-side surface;
- a second lens element with positive refractive power;
- a third lens element with negative refractive power;
- a fourth lens element with refractive power having a convex object-side surface, wherein the object-side surface and an image-side surface of the fourth lens element are aspheric;
- a fifth lens element with refractive power having a convex image-side surface, wherein an object-side surface and the image-side surface of the fifth lens element are aspheric; and
- a sixth lens element with negative refractive power having a concave image-side surface, wherein the image-side surface of the sixth lens element changes from concave at a paraxial region to convex at a peripheral region, and an object-side surface and the image-side surface of the sixth lens element are aspheric;
- wherein a focal length of the optical photographing lens system is f, a focal length of the first lens element is f1, a focal length of the second lens element is f2, a focal length of the fourth lens element is f4, a curvature radius of the object-side surface of the fourth lens element is R7, and the following relationships are satisfied:

$0<f2/f1<5.0;$ $0<(f/f1)/((f/f2)+(f/f4))<2.0;$ and $0.5<f/R7<3.0.$

15. The optical photographing lens system of claim 14, wherein the focal length of the optical photographing lens system is f, the curvature radius of the object-side surface of the fourth lens element is R7, and the following relationship is satisfied:

$0.8<f/R7<2.4.$

16. The optical photographing lens system of claim 15, wherein the focal length of the optical photographing lens system is f, the focal length of the fourth lens element is f4, and the following relationship is satisfied:

$-0.2<f/f4<0.5.$

17. The optical photographing lens system of claim 14, wherein the object-side surface of the fifth lens element is concave.

18. The optical photographing lens system of claim 14, wherein the first lens element has a concave image-side surface, the second lens element has a convex image-side surface, the focal length of the first lens element is f1, the focal length of the second lens element is f2, and the following relationship is satisfied:

$0<f2/f1<1.0.$

19. The optical photographing lens system of claim 14, wherein an axial distance between the second lens element and the third lens element is T23, a distance in parallel with an optical axis between a maximum effective diameter position on an image-side surface of the second lens element and a maximum effective diameter position on an object-side surface of the third lens element is ET23, and the following relationship is satisfied:

$0<T23/ET23<0.45.$

20. The optical photographing lens system of claim 14, wherein a curvature radius of an object-side surface of the second lens element is R3, a curvature radius of an image-side surface of the second lens element is R4, and the following relationship is satisfied:

$-0.4<(R3+R4)/(R3-R4)<0.4.$

21. The optical photographing lens system of claim 20, wherein a central thickness of the third lens element is CT3, a central thickness of the fourth lens element is CT4, and the following relationship is satisfied:

$0.20 \text{ mm}<CT3+CT4<0.65 \text{ mm}.$

22. The optical photographing lens system of claim 20, wherein an Abbe number of the first lens element is V1, an Abbe number of the third lens element is V3, and the following relationship is satisfied:

$0.3<V3/V1<0.5.$

23. An optical photographing lens system comprising, in order from an object side to an image side:
- a first lens element with positive refractive power having a convex object side surface;
- a second lens element with positive refractive power;
- a third lens element with negative refractive power;
- a fourth lens element with refractive power having an object-side surface and an image-side surface being aspheric;
- a fifth lens element with positive refractive power having a convex image-side surface, wherein an object-side surface and the image-side surface of the fifth lens element are aspheric; and
- a sixth lens element with negative refractive power having a concave image-side surface, wherein the image-side surface of the sixth lens element changes from concave at a paraxial region to convex at a peripheral region, and an object-side surface and the image-side surface of the sixth lens element are aspheric;
- wherein a focal length of the optical photographing lens system is f, a focal length of the first lens element is f1, a focal length of the second lens element is f2, a focal length of the fourth lens element is f4, an f-number of the optical photographing lens system is Fno, and the following relationships are satisfied:

$0<f2/f1<5.0;$ $0<(f/f1)/((f/f2)+(f/f4))<2.0;$ and $1.5<Fno<2.5.$

24. The optical photographing lens system of claim 23, wherein an Abbe number of the first lens element is V1, an Abbe number of the third lens element is V3, and the following relationship is satisfied:

$0.3<V3/V1<0.5.$

25. The optical photographing lens system of claim 23, wherein the second lens element has a convex image-side surface, the focal length of the optical photographing lens system is f, the focal length of the first lens element is f1, the focal length of the second lens element is f2, the focal length of the fourth lens element is f4, and the following relationship is satisfied:

$0<(f/f1)/((f/f2)+(f/f4))<1.0.$

26. The optical photographing lens system of claim 23, wherein an axial distance between the second lens element and the third lens element is T23, a distance in parallel with an optical axis between a maximum effective diameter position on an image-side surface of the second lens element and a maximum effective diameter position on an object-side surface of the third lens element is ET23, and the following relationship is satisfied:

$$0 < T23/ET23 < 0.45.$$

27. The optical photographing lens system of claim 23, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following relationship is satisfied:

$$0.1 < (T12+T23)/(T34+T45) < 0.32.$$

28. The optical photographing lens system of claim 23, wherein the object-side surface of the fourth lens element changes from convex at a paraxial region thereof to concave at a peripheral region thereof, and the image-side surface of the fourth lens element changes from concave at a paraxial region thereof to convex at a peripheral region thereof.

* * * * *

UNITED STATES PATENT AND TRADEMARK OFFICE
CERTIFICATE OF CORRECTION

PATENT NO. : 8,724,237 B2
APPLICATION NO. : 13/671542
DATED : May 13, 2014
INVENTOR(S) : Po-Lun Hsu et al.

Page 1 of 1

It is certified that error appears in the above-identified patent and that said Letters Patent is hereby corrected as shown below:

In the Claims:

(1) In column 35, line 28, Claim 1 of the issued patent reads as "second lens element...", but it should read as "a second lens element...".

(2) In column 35, line 56, Claim 2 of the issued patent reads as "...first lens element is f1 the...", but it should read as "...first lens element is f1, the...".

Signed and Sealed this
Fourteenth Day of October, 2014

Michelle K. Lee
*Deputy Director of the United States Patent and Trademark Office*